(12) United States Patent
Collison et al.

(10) Patent No.: US 7,530,078 B2
(45) Date of Patent: May 5, 2009

(54) CERTIFIED MESSAGE DELIVERY AND QUEUING IN MULTIPOINT PUBLISH/SUBSCRIBE COMMUNICATIONS

(75) Inventors: Derek L. Collison, Foster City, CA (US); Dan Leshchiner, Mountain View, CA (US); Dennis R. Page, Mountain View, CA (US)

(73) Assignee: TIBCO Software Inc., Palo Alto, CA (US)

( * ) Notice: Subject to any disclaimer, the term of this patent is extended or adjusted under 35 U.S.C. 154(b) by 195 days.

(21) Appl. No.: 11/458,062

(22) Filed: Jul. 17, 2006

(65) Prior Publication Data
US 2006/0248143 A1 Nov. 2, 2006

Related U.S. Application Data

(63) Continuation of application No. 09/502,873, filed as application No. PCT/US98/17115 on Aug. 18, 1998, now Pat. No. 7,080,385.

(60) Provisional application No. 60/056,342, filed on Aug. 18, 1997.

(51) Int. Cl.
*G06F 13/00* (2006.01)
(52) U.S. Cl. .................. 719/318; 719/313; 719/314
(58) Field of Classification Search ............ 719/313, 719/314, 318
See application file for complete search history.

(56) References Cited

U.S. PATENT DOCUMENTS

| | | | |
|---|---|---|---|
| 4,356,550 A | 10/1982 | Katzman et al. | |
| 5,003,473 A | 3/1991 | Richards | |
| 5,136,501 A | 8/1992 | Silverman et al. | |
| 5,187,787 A | 2/1993 | Skeen et al. | |
| 5,257,369 A | 10/1993 | Skeen et al. | |
| 5,325,303 A | 6/1994 | Walz et al. | |
| 5,339,392 A | 8/1994 | Risberg et al. | |
| 5,555,404 A | 9/1996 | Torbjornsen et al. | |
| 5,557,798 A | 9/1996 | Skeen et al. | |
| 5,634,012 A | 5/1997 | Stefik et al. | |
| 5,680,551 A | 10/1997 | Martino, II | |
| 5,805,786 A * | 9/1998 | Badovinatz et al. ............ 714/4 |

(Continued)

FOREIGN PATENT DOCUMENTS

EP          0258867          3/1988

(Continued)

OTHER PUBLICATIONS

EP 98942106 Supplementary European Search Report dated May 28, 2004.

(Continued)

*Primary Examiner*—Andy Ho
(74) *Attorney, Agent, or Firm*—Baker & McKenzie LLP

(57) ABSTRACT

A method for certified delivery of an outgoing message or messages in a multipoint anonymous, publish/subscribe telecommunications system. The system for utilizing the method and program product is one having at least one publisher (10) and at least one subscriber (20). The method is carried out by first establishing a certified delivery session ledger. Next each outgoing message is labeled with a label including the delivery session name and a sequence number. The labeled outgoing message or messages are then sent to subscribers, and received by a subscriber. Various protocols are described.

18 Claims, 2 Drawing Sheets

U.S. PATENT DOCUMENTS

| | | |
|---|---|---|
| 5,809,145 A | 9/1998 | Slik et al. |
| 5,838,969 A * | 11/1998 | Jacklin et al. ............... 719/318 |
| 5,845,073 A | 12/1998 | Carlin et al. |
| 5,925,108 A * | 7/1999 | Johnson et al. ............. 719/318 |
| 5,961,586 A | 10/1999 | Pedersen |
| 6,038,601 A | 3/2000 | Lambert et al. |
| 6,125,388 A | 9/2000 | Reisman |
| 6,421,737 B1 | 7/2002 | Stone et al. |
| 6,446,136 B1 | 9/2002 | Pohlmann et al. |
| 6,477,585 B1 | 11/2002 | Cohen et al. |
| 6,633,313 B1 * | 10/2003 | Cirne et al. ................. 715/744 |
| 6,714,990 B1 | 3/2004 | Autio et al. |
| 6,731,627 B1 | 5/2004 | Gupta et al. |

FOREIGN PATENT DOCUMENTS

| | | |
|---|---|---|
| WO | WO9510805 | 4/1995 |
| WO | WO9710558 | 3/1997 |

OTHER PUBLICATIONS

PCT/US98/17115 International Preliminary Examination Report dated Apr. 20, 2000.

PCT/US98/17115 Written Opinion dated Oct. 28, 1999.

* cited by examiner

CERTIFIED MESSAGE DELIVERY AND QUEUING IN MULTIPOINT PUBLISH/SUBSCRIBE COMMUNICATIONS

CROSS-REFERENCE TO RELATED APPLICATIONS

This Application is a continuation of U.S. patent application Ser. No. 09/502,873, now U.S. Pat. No. 7,080,385, filed Feb. 11, 2000, which claims priority to PCT/US98/07115 filed Aug. 18, 1998, which claims priority to U.S. Provisional Application No. 60/056,342 filed on Aug. 18, 1997. All referenced applications/patents are commonly assigned with the present application and are incorporated herein by reference in their entirety for all purposes.

BACKGROUND TO THE INVENTION

1. Technical Field

This invention relates to multipoint publish/subscribe communications and, more particularly, to certified message delivery and queuing between multipoint computer-based publisher and subscriber applications.

2. Background

In a typical anonymous public/subscribe technologies—such as described in U.S. Pat. Nos. 5,557,798; 5,339,392; 5,257,369 and 5,187,787—a publisher application publishes information to requesting or subscriber applications without having any knowledge of the number, identity or address of any such subscriber applications. In fact, no subscriber applications may exist. Instead of knowing about subscribers, a publisher will merely publish information applying a context or subject "label" to the published message. A subscriber then identifies desired messages by the content label and receives only those messages relevant to the desired content.

The advantages of such a publish/subscribe, content-based addressing systems are well known and include the ability to decouple subscribers and publishers from one another. This decoupling allows publishers and subscribers to operate without having any knowledge of the identity, location or address, or communication protocols of each other. The flexibility that this offers is enormous and, accordingly, such content/subject-based addressing communication-enviroments are becoming increasingly popular.

Unfortunately, the very advantages (such as anonymous decoupling) of these systems, precludes the use of conventional reliable messaging protocols such as TCP. TCP, and other reliable messaging protocols apply only in point-to-point type of communications. In these point-to-point communications message senders and receivers are directly linked to one another and therefore know each other's addresses and locations.

Unfortunately, these reliable messaging protocols—that guarantee arrival and order of arrival of messages—require advance knowledge between applications. They are, therefore, not applicable to typical publish/subscribe environments.

Yet, such reliable or certified delivery of messages is extremely important. For example, certified delivery is appropriate when a sending application requires individual confirmation of delivery for each message it sends. For example, a travelling sales representative computes sales figures on a lap-top computer, and sends them to a supervisor at the office. The user must know for certain that the data has arrived, and has been included in the supervisor's sales report.

Certified delivery is also appropriate when a receiving application cannot afford to miss any messages. For example, in an application that processes orders to buy and sell inventory items, each order is important. If any orders are omitted, then inventory records are incorrect.

In addition, certified delivery is appropriate when each message on a specific subject builds upon information in the previous message with that subject. For example, a sending program updates a receiving database, contributing part of the data in a record, but leaving other parts of the data unchanged. The database is correct only if all updates arrive in the order they are sent.

Furthermore, certified delivery is appropriate in situations of intermittent physical connectivity—such as discontinuous network connections, for example, an application in which several mobile lap-top computers must communicate with one another. Connectivity between mobile units is sporadic, requiring persistent storage of messages until the appropriate connections are reestablished.

Thus, a very real need exists for having both the advantages of certified messaging and the advantages of content-based, anonymous publish/subscribe environments.

SUMMARY OF THE INVENTION

Briefly, according to this invention a publisher publishes a message to any number of unknown subscribers. Note, as used herein "publisher" and "sender" are used synonymously, and "subscriber" and "listener" are used synonymously. The message is published indicating the subject or content using typical content-based publish/subscribe protocols. Subscribers interested in receiving information on the designated content receive the message without knowing about the publisher. Thus the publisher information remains transparent to the subscriber.

In circumstances where the certified messaging is required, the invention provides for establishing a message delivery tracking session. This session includes a name and a ledger used for tracking.

Using these functions the system can track delivery of messages and notify publishers/senders if messages are not delivered. In one embodiment of the invention, delivery attempts are repeated for a preset time (or number of delivery attempts) to ensure or attempt to ensure delivery.

This invention also extends to queuing messages for certified delivery. This occurs when certified delivery is required for a one of a group of n possible recipients. The system ensures that one (and not all) of the group receives the message. This is accomplished by having members of the group indicate their availability or capacity and having the system route the message to the subscriber (listener) with the greatest availability.

An extension of this concept is the scheduling of tasks for a group of n possible task performers, each available to accomplish a task. Each task doer, notifies the system of its availability/ability to accomplish tasks. Tasks are then sent to/queued for each task doer according to a rating based on its availability.

Advantages of the Invention

This invention has a number of advantages. For example, it provides:

Certainty

Certified delivery assures application programs that every message reaches each intended recipient—in the order sent. When delivery is not possible, both senders and, optionally, listeners receive explicit information about each undelivered message.

Convenience

Once a program sends a certified message, the system continues delivery attempts until delivery succeeds, or until the message's time limit expires.

Control

Application programs determine an explicit time limit for each message.

Sending applications can disallow certified delivery to specific listening sessions.

Detail

The system can also present advisory messages to inform application programs of every significant event relating to delivery.

Process-Based or File-Based Recording

The system can also record the status of each message in a ledger. Applications that require certification only for the duration of the application process can choose a process-based ledger. Applications that require certification that transcends process termination and restart can choose a file-based ledger.

The invention will be described in grater detail below with reference to the accompanying drawings.

SPECIFIC DESCRIPTION

Overview

Figure 1:
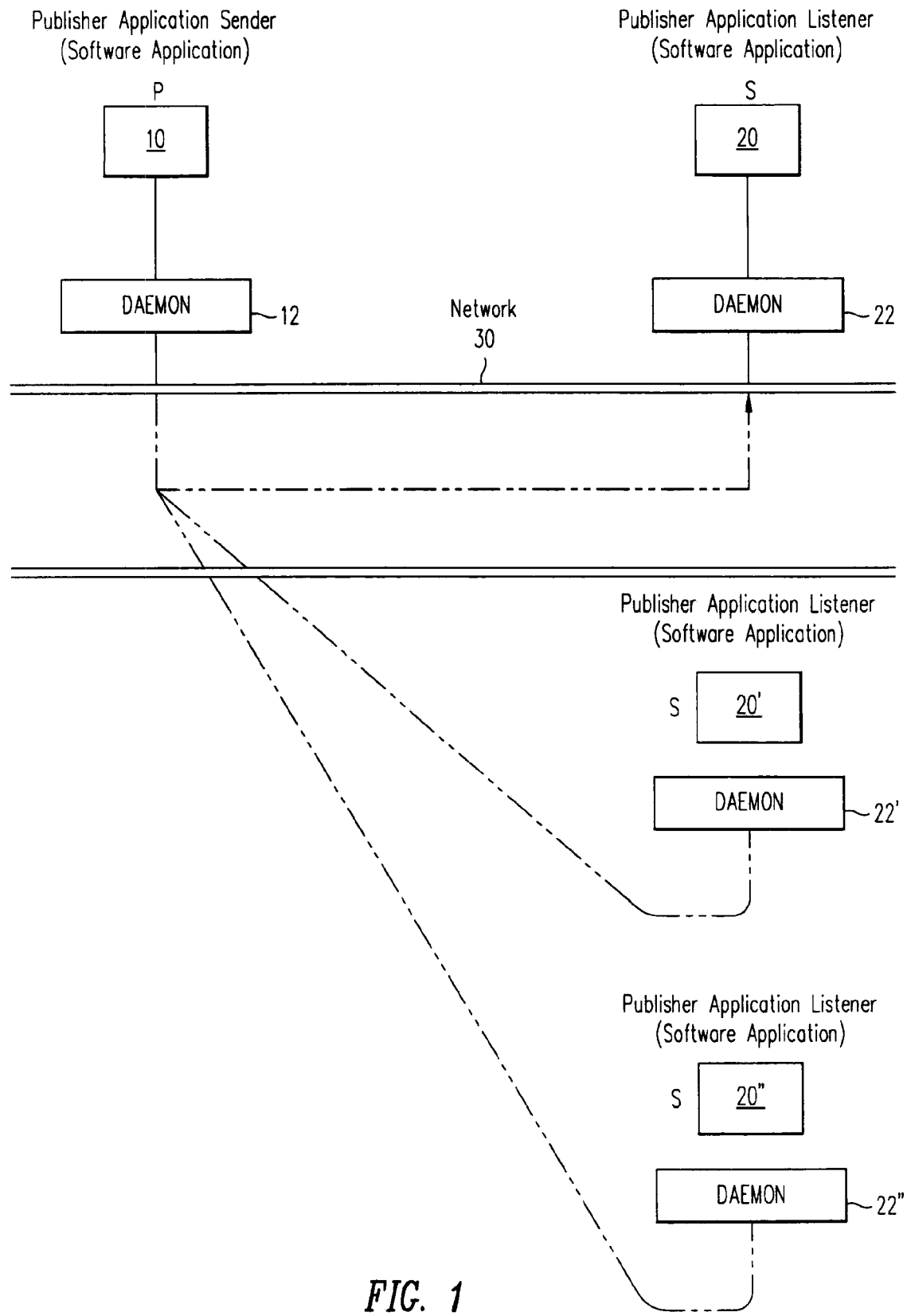
FIG. 1 is a schematic representation of a typical publish/subscribe environment useful for illustrating this invention.

FIG. 1 shows a publisher application (sender) 10 and a plurality of subscriber applications (listeners) 20, 20' and 20". In the preferred embodiment of this invention the publisher and subscriber(s) are software applications based on one or more computers interconnected by a network 30 providing a data path among the applications. The publisher 10 and subscriber(s) 20 preferably implement a content-based communications protocol whereby a publisher publishes a message indicating only the content of the message and without knowing the identity or protocols used by the subscriber(s) 20. These inter-application communications are established by communications daemons 12 (associated with a publisher/sender) and 22, 22' and 22" (associated with the subscriber/listener 20, 20' and 20"). The arrangement shown in this figure is well known and described in many publications including the patents referred to above.

As is described in much greater detail below, a listener 20 can register with a specific publisher 10 to receive certified messages. This communication includes the subscribers name, its "inbox" address and the subject/content of messages it requires information on. Thus the publisher 10 will have a list of subscriber names and inboxes (but know nothing else about the subscriber) for all subscribers wishing to receive certified messages. The publisher/sender 10 will therefore expect an acknowledgement of each message it sends out; an acknowledgement it would receive from a subscriber/listener 20, 20' and/or 20". Importantly, if the publisher/sender 10 does not receive the acknowledgement, it sends an acknowledgement request message, usually for a predetermined time or number of "sends."

In the event the subscriber wishes to have guaranteed delivery of messages, the publisher can save the message to disk (or other storage) until an acknowledgement of subscriber receipt occurs. Thus, until message times out, the subscriber can, at a later date, receive the message by contacting the publisher. This would usually happen where messages are very dependent on their sequence or build upon prior message. In these circumstances missing/unreceived messages could be catastrophic. Also, in these (and in most certified messaging applications of this invention) each certified message is assigned a tracking number. This allows both sender and listener/subscriber to monitor which messages are received and/or missing.

In many applications, data communications are highly reliable, but in some situations applications were even stronger assurances of delivery. Certified delivery features offers greater certainty of delivery even in situations where processes and their network connections are unstable.

Certified Messaging

Enabling a Delivery-Tracking Session

The first step toward certified delivery is to enable a delivery-tracking session. A delivery-tracking session begins as an ordinary anonymous publish/subscribe session; enabling a session adds information so that it can participate in certified delivery protocols. The additional information includes a name and a ledger.

Delivery-tracking sessions can send and receive messages, just as ordinary sessions can. In addition, delivery-tracking sessions can participate in certified delivery calls (that is, calls in the rvcm library layer); ordinary sessions cannot participate in these calls. (Notice the asymmetry. Delivery-tracking sessions can participate in ordinary calls, but ordinary sessions cannot participate in certified delivery calls.)

Name

Each delivery-tracking session has a name which may be reusable, or non-reusable. The name identifies the session to other delivery-tracking sessions, and is part of the label that identifies outbound messages from the session.

A name is reusable when a program supplies it explicitly to the enabling call. When a session with a usable name also has a file-based ledger, it operates as instance of a persistent correspondent—which allows continuity of certified delivery beyond session termination and program restarts.

Two delivery-tracking sessions must not bind the same reusable name that is, at any moment in time, each reusable name must be unique. Sessions may reuse a name sequentially, but not simultaneously. Violating this rule can significantly obstruct certified delivery. Typically, session names have the same syntax as subject names.

Programs may omit a name in the enabling call—in which case the call generates a unique, non-reusable name for the session. No other session on any computer can ever have the same name. As a result, a session with a non-reusable name operates as a transient correspondent—no subsequent session can continue the certified delivery behavior of the session.

Enabling a delivery-tracking session crates a ledger for it. Certified delivery software uses the ledger to record information about every unresolved outbound certified message, every subject for which this session receives (inbound) certified messages, and other cooperating delivery-tracking sessions.

Programs may store the ledger in a ledger file, or in process-based storage within the running program. (Even when a session uses a ledger file, it may sometimes replicate parts of the ledger in process-based storage for efficiency; however, programmers cannot rely on this replication.)

Ledger files must be unique. That is, two sessions must not use the same ledger file (concurrently). If an operating system supports raw disk devices (also called raw partitions), a device can be specified as the ledger file.

A session with a file-based ledger and a reusable name qualifies as a persistent correspondent, with certified delivery behavior that can extend beyond session termination.

Labeled Message

A labeled message is like an ordinary message, except that it includes supplementary information, which delivery-tacking sessions can use for certified message delivery:

The name of the delivery-tracking session that sent the message.

A sequence number assigned by the sending session.

Sending a Labeled Message

Any delivery-tracking session can send a labeled message by using the sending calls in the certified message delivery library layer. Examples of such delivery-Tracking Send Calls are in the table below.

| | |
|---|---|
| C | rvcm_Send ( ), rvcm_SendWithReply ( ) |
| C++ | RvCmSender:: certifiedSend ( ), |
| | RvCmSender:: certifiedSendRequest ( ) |
| Java | RvCmSender. certifiedSend ( ), |
| | RvCmSender. certifiedSendRequest ( ) |

Receiving a Labeled Message

For clarity, two kinds of listening endpoints are distinguished. An ordinary listener is a listener created with an ordinary listening call, such as the C functions rv_ListenInbox ( ) or rv_ListenSubject ( ). A delivery-tracking listener is a listener created with a delivery-tracking listening call, such as the C functions rvcm_ListenInbox ( ) or rvcm_ListenSubject ( ).

Either type of listening endpoint can receive a labeled message—delivery-tracking listeners (created by the certified delivery library), as well as ordinary listeners.

When an ordinary listener receives a labeled message, it presents it to the appropriate callback function as if it were an ordinary message. That is, it ignores the supplementary information that distinguishes a labeled message.

When a delivery-tracking listener receives a labeled message, its behavior depends on context:

If a delivery-tracking listener is registered for certified delivery, it presents the supplementary information to the callback function.

If a delivery-tracking listener is not registered for certified delivery, it presents a "null"
sender's name to the callback function, with a sequence number of zero.

In addition, if appropriate, the certified delivery library automatically requests that
the sender register the listener for certified delivery.

Discovery and Registration for Certified Delivery

Discovery

When a delivery-tracking listener receives a labeled message from a delivery-tracking sender that is not listed in the listener's ledger, the listener "discovers" the sender on the message subject.

Three events follow discovery:

Certified delivery software adds the sender's name to the listener's ledger, as a source of messages on the subject.

Certified delivery software in the listening program contacts the sending program to request registration for certified delivery of the subject and information regarding the agreement.

Certified delivery software presents a REGISTRATION.DISCOVERY advisory to the listening program.

Registration

When a delivery-tracking sender receives a registration request from a delivery-tracking listener, the sender automatically accepts the request. Acceptance consists of these four events:

Certified delivery software registers the listener for certified delivery of the subject—recording that fact in the sender's ledger.

Certified delivery software in the sending program notifies the listener session that the registration requested is accepted—the sender accepts responsibility for certified delivery on the subject.

Certified delivery software presents a REGISTRATION.REQUEST advisory to the sender session, informing it of the new registered listener.

When the certified delivery software in the listening program receives the acceptance reply, it presents a REGISTRATION CERTIFIED advisory to the listener session.

Certified Delivery Agreement

Following registration and acceptance, the sender and listener have a certified delivery agreement on the subject.

The sender is responsible to record each outbound message on that subject, and to retain the message in its ledger until it receives confirmation of delivery from the listener (or until the time limit of the message expires).

In return, the listener is responsible to confirm delivery of each message, and to request retransmission when a message arrives out of sequence.

The system arranges all of this accounting automatically. The sending and listening programs do not participate directly in these protocols—only indirectly, by sending and listening with certified delivery library calls.

Notice that a certified delivery agreement applies in one direction only—from a sender to a listener. A two-way conversation requires two separate certified delivery agreements.

We refer to the two participants in a certified delivery agreement as a certified sender and a certified listener, and the labeled messages that flow between them are certified messages. Notice the subtle difference in terminology—before establishing a certified delivery agreement, the participants are delivery-tracking senders and listeners; afterward, they are certified senders and listeners. A labeled message is only a certified message when the sender and receiver maintain a certified delivery agreement.

Delivering a Certified Message

Once a delivery agreement is in place, all subsequent messages on the subject (from the certified sender to the certified listener) are certified messages. Each certified message generates a series of protocol events:

When the system presents a certified message to the listening callback function, it includes the sequence number assigned (automatically) by the sending Software and the publisher's name.

When the callback function returns, certified delivery software automatically confirms delivery to the sender and records confirmation to a ledger. (Programs can override this behavior and confirm delivery explicitly.)

When confirmation reaches the sending program, certified delivery software records delivery in the sender's ledger, and presents a DELIVERY.CONFIRM advisory to the sender session.

When confirmation has arrived from every certified listener for this message, certified delivers software deletes the message from the sender's ledger, and presents a DELIVERY.COMPLETE advisory to the sender session.

Automatic Confirmation of Delivery

The default behavior of certified listeners is to automatically confirm message delivery upon return from the data callback function. Programs can selectively override this behavior for specific listening endpoints (without affecting other listening endpoints).

By overriding automatic confirmation, the listener assumes responsibility for explicitly confirming each inbound certified message.

Consider overriding automatic confirmation when processing inbound messages involves asynchronous activity, such as computations in other threads, database queries, or additional network communications.

Requesting Confirmation

If a certified sender does not receive prompt confirmation of delivery from a certified listener (for example, because of network glitches), the system in the sending program automatically requests confirmation. After each request, it presents a DELIVERY. NO_RESPONSE advisory to the sending session.

When a listener receives a request for confirmation, it checks its ledger, and reconfirms receipt of the messages that it has already confirmed. (This behavior is identical, whether the program uses automatic confirmation, or overrides it.)

Sequencing and Retransmission

A delivery-tracking sender assigns sequence numbers serially for each outbound subject, so the sequence numbers reflect the order of messages from a sender on a specific subject.

When certified delivery software presents certified messages to a certified listener, it preserves the sequence in which the sender sent them. If a message arrives out of sequence, certified delivery software in the listener does not present it to the callback function until all the preceding messages are available.

For example, a certified listener is receiving certified delivery for the subject FOO from a sender named BAZ. After receiving and presenting message number 32, the next message to arrive is message 35. Certified delivery software holds message 35 until it can first present messages 33 and 34.

Meanwhile, the certified delivery software in FOO requests retransmission of messages 33 and 34 from Baz. In a case where the time limit on those messages has expired—so BAZ no longer has them in its ledger—certified delivery software presents a DELIVERY.UNAVAILABLE advisory to the listener, indicating that messages 33 and 34 are no longer available. Then it presents message 35 to the data callback function.

Persistent Correspondents

We introduced the concept of persistent correspondents in the section Name, page 144. A reusable name and a file-based ledger allow a persistent correspondent to continue certified delivery beyond the termination and restart of a session or process.

EXAMPLE

Consider an example application systems in which application program JOE generates important information, and sends it to application program SUE in certified messages on the subject REMEMBER.THIS. Upon receipt, SUE stores the information in a database.

If either JOE or SUE terminate unexpectedly, it is crucial that certified messages still arrive for entry into the database. To ensure this result, both programs must represent persistent correspondent—that is, both programs enable sessions with reusable names (JOE_PC and SUE_PC), and each program keeps a file-based ledger. In addition, SUE requires old messages when it enables the Anon SUE_PC.

During operation, JOE has sent message number 57 on the subject REMEMBER.THIS but has not yet received delivery confirmation for messages 53-56. SUE is processing message 53, when a sudden hardware failure causes to terminate. Meanwhile, JOE continues to send messages 58-77.

The computer restarts, and SUE restarts. The ledger file for SUE_PC indicates that message 52 was received and confirmed for the subject REMEMBER.THIS a given publisher as JOE_PC. On restart SUE_PC will contact JOE_PC and reestablish their certified delivery agreement. When JOE accepts, JOE_PC retransmits the stored messages 53-77 on that subject.

In the above scenario it is important to notice the following:

That SUE does not miss any REMEMBER.THIS messages. However, the new SUE must gracefully fix any difficulties caused by partial processing of message 53 by the old SUE.

JOE and SUE communicate using a broadcast subject name not an inbox. Inbox names are unique, so they cannot continue beyond session termination and restart.

Anticipating a Listener

In some situations, a delivery-tracking sender can anticipate the request for certified delivery from a persistent correspondent that has not yet begun listening.

Consider an example in which a database program (DB) records all messages with the subject STORE.THIS. The program DB enables a session that instantiates a persistent correspondent named DB_PC. All programs that send messages with the subject STORE.THIS depend on this storage mechanism.

One such sending program is JAN. Whenever JAN starts, it can anticipate that DB_PC will request certified delivery of the subject STORE_THIS. Suppose that JAN starts, but DB is not running, or a network disconnect has isolated JAN from DB. Anticipating that it will eventually receive a registration request for STORE.THIS from DB_PC, JAN makes an add listener call. The effect is that the software within JAN behaves as if it has a certified delivery agreement with DB_PC for the subject STORE-.THIS. It stores outbound messages (on that subject) in its ledger. When DB restarts, or the network reconnects, JAN automatically retransmits all the stored messages to DB.

Cancelling Certified Delivery

Both listeners and senders can cancel a certified delivery agreement.

Listeners cancel by closing the listening endpoint, using calls listed below. Senders with certified delivery agreements to the closed endpoint receive REGISTRATION.CLOSED advisories. HOST.LISTEN.STOP advisories inform other applications of the change.

Senders can cancel certified delivery of a specific subject to a specific listener. The sender program deletes from its ledger all information about delivery of the subject to the listener. The sending program receives a REGISTRATION.CLOSED advisory. If the listening correspondent is available (running and reachable), it receives a REGISTRATION.NOT_CERTIFIED advisory. (Unlike the disallow listener calls in Table 7, these calls do not cause denial of subsequent registration requests.)

Disallowing Certified Delivery

As described before senders automatically accept all registration requests. This is true except when the sending program explicitly disallows certified delivery to a listening session. Calls that disallow a listener cancel existing certified delivery agreements with the listener session (on all subjects), and cause certified delivery software to automatically deny subsequent registration requests from the listener session.

When a sender has disallowed a listener, the events connected with registration do not occur. Instead, certified delivery software in the sender notifies the listener session that the request is disallowed. When certified delivery software in the listening program receives the rejection notice, it presents a REGISTRATION.NOT_CERTIFIED advisory to the listening session.

Allow listener calls supersede the effect of a previous disallow listener call, allowing subsequent registration requests from the listener session to succeed.

No Response to Registration Requests

It is possible that a registration request never reaches the delivery-tracking sender, or the acceptance notice never reaches the listening program (for example, because of network glitches, or termination of the sending program). After repeated attempts to register without response from the sender, certified delivery software in the listening program presents a REGISTRATION.NO_RESPONSE advisory to the listening session. After several attempts to register with no response, the listener stops sending requests.

Reusable Names

Sessions that represent persistent correspondents require reusable names. Reusable names must obey the syntax for subject names. Reusable names must not contain wildcard characters. Reusable names may not begin with reserved elements (such as _INBOX, _RV or _LOCAL). For best performance, reusable names should be kept short—only a few characters, typically no more than three or four elements, and no more than 50 characters in total.

Ledger Storage Mode

Each delivery-tracking session records information in a ledger, which occupies storage space within the application Process. A session that represents a persistent correspondent must also keep a copy of the ledger in a file. The file-based ledger preserves certified delivery information beyond session (or process) termination and restart.

This feature has two associated costs:

The ledger file consumes disk space.

The application program pauses to update the ledger file at each significant event.

Transient correspondents need not pay these costs, because they do not use ledger files. However, keeping the ledger in process-based storage consumes process memory.

Ledger Size

The size of the ledger depends on several factors—the most important of which is the retention rate of stored data. That is, the ledger grows fastest in response to the cumulative length of incompletely delivered messages.

Program developers can estimate the expected size of the ledger, and must ensure that the process can allocate sufficient memory to contain it. For a file-based ledger, ensure that sufficient disk space is available as well, as memory requirements for the process application change when utilizing a file-based ledger.

Event Manager

The system's certified delivery depends on the event manager for timer and I/O events. When an application enables a delivery-tracking session, that session must be an event-managed session.

No Synchronous Sessions

Synchronous sessions are not valid for certified delivery calls and all delivery-tracking sessions must be asynchronous, event-managed sessions.

Distributed Queues

Figure 2:
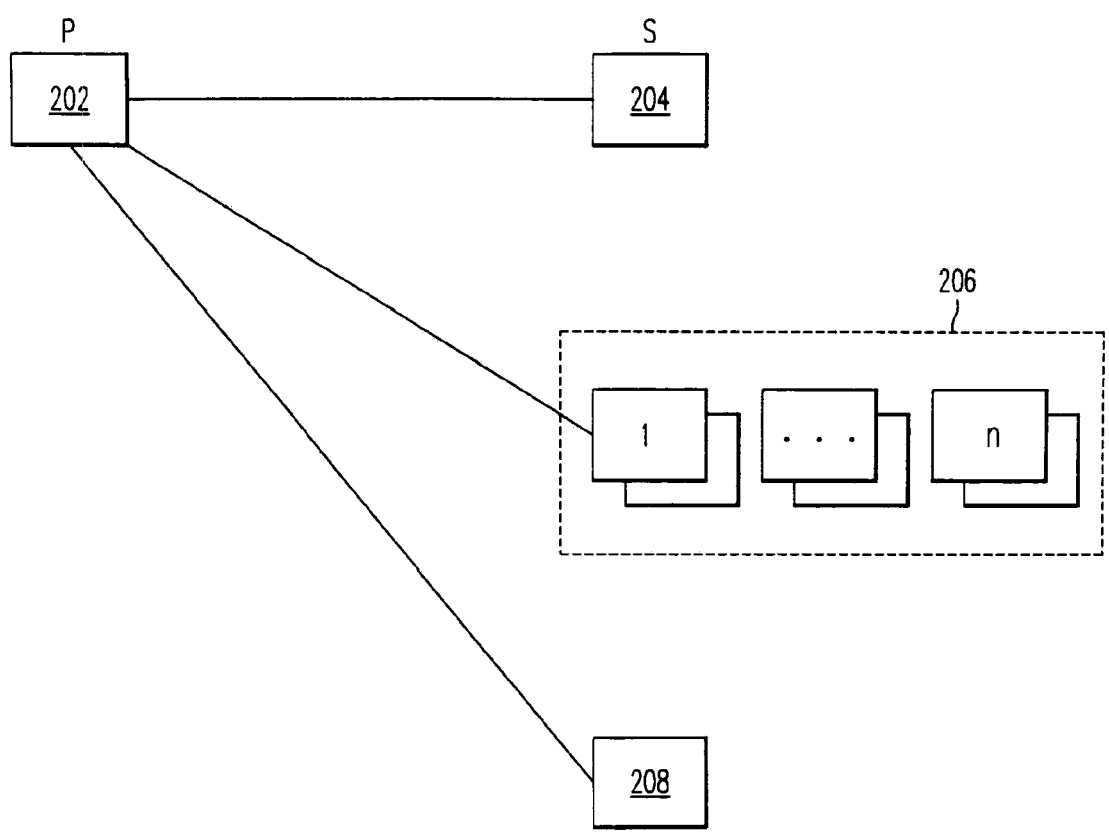
FIG. 2 is a schematic representation of a typical publish/subscribe environment useful in illustrating the distributed queuing and task scheduling aspects of the invention.

The system also provides use of distributed queues for one-of-n certified delivery. In particular, the system provides for distributed queueing of messages along with certified/guaranteed delivery in a "one-of-n" delivery mechanism. This delivery mechanism is illustrated in FIG. 2 in which a single publisher 202 is publishing messages to three registered subscribers 204, 206 and 208 respectively. One of the subscribers, 206 is a large group of n-subscribers.

Distributed queueing addresses the problem that it is undesirable for all n-subscribers in registered subscriber 206 to get every message published by publisher 202. For example, it may be undesirable because each of the n-subscribers in group 206 will take an action. In addition, if each subscriber is to receive the message (and possibly respond to it) this will consume additional network bandwidth.

Nonetheless, it is imperative (hence the need for certified/guaranteed delivery) for at least one of the n-subscribers in group 206 to receive the message. I.e., ideally the system should deliver the message to only one of the n-subscribers 206. This type of situation arises where a large number n of subscribers 206 is required to provide the desired level of fault tolerance and/or load balancing. Fault tolerance is important in situations where applications may be unstable or message delivery is absolutely critical.

In the system of the invention, each subscriber application in the group 206 operates by sending messages to another of the n-subscribers in the group 206 acting as a scheduler giving an indication of its weight. The scheduler then responds by sending the message to the particular subscriber in the group with the greatest weight. Greater details of how this is accomplished follow directly below.

Accordingly, a distributed queue of subscribing database servers 206 can accept certified message that represent tasks (updates and queries). The system assigns each task to exactly one of the servers, while the group of servers and the distribution of tasks remains completely transparent to the client processes.

Queue Members

The member sessions of a distributed queue all share the same reusable correspondent name indicating that they are members of the queue with that name. Each member of a distributed queue listens for the same subjects—yet even when n members listen, for each inbound message (or task), only one member processes the message.

Member Roles—Worker and Scheduler

As used herein with respect to queueing and queued delivery, the terms "listener" and "worker" are used interchangeably. Each distributed queue member session can have two distinct roles—as a worker, and as a potential scheduler.

In the listener or worker role, queue member sessions support a limited subset of certified delivery calls; members can listen to a subject, override automatic confirmation of delivery and confirm delivery. Queue member sessions do not support any other certified delivery calls (in particular, calls associated with sending certified messages). However, they do support all standard calls (for example, sending ordinary messages).

The system includes fault tolerance software that maintains exactly one active scheduler in each queue; if the scheduler process terminates, another member assumes the role of scheduler. The queue member session in the scheduler role assigns inbound tasks to listeners in the queue. (A scheduler can assign tasks to its own listener component, but only does so when all other listeners are busy.)

The Scheduler as a Fault-Tolerant Component

Although any queue member has the potential to become the scheduler, fault tolerance software maintains exactly one scheduler at all times. Fault tolerance parameters guide the software to select the most suited member as scheduler.

Scheduler weight represents the ability of a member session to fulfill the role of scheduler, relative to other members of the same queue, i.e., the greatest availability or unused member resources. The queue members use relative scheduler weight values to elect one member as the scheduler; members with higher scheduler weight take precedence.

The active scheduler sends heartbeat messages at the interval specified by the user. Heartbeat messages inform other members that a member is acting as the scheduler. All sessions in the queue must specify the same scheduler heartbeat interval.

In addition, all sessions in the queue must specify the same scheduler activation interval. When the heartbeat signal from the scheduler has been silent for this interval the queue member with the greatest scheduler weight takes its place as the new scheduler.

Assigning Tasks to Workers

The scheduler assigns each task to a worker or listener (another queue member session). That worker or listener alone processes the task message in a data callback function.

Worker Weight

Relative worker or listener weights assist the scheduler in assigning tasks. When the scheduler receives a task, it assigns the task to the available worker or listener with the greatest worker or listener weight.

Enabling a session as a queue member tacitly sets its worker or listener weight parameter to 1. That is, all members implicitly have the same worker or listener weight, unless program code explicitly changes the worker or listener weight.

Availability

When the scheduler receives a task, it assigns the task to the available worker listener with the greatest listener weight.

A worker listener is considered available unless either of these conditions are true:

The pending tasks assigned to the worker or listener exceed its task capacity.

The worker or listener session is the scheduler. (The scheduler assigns tasks to its own worker or listener only when all other workers or listeners are busy.)

Task Capacity

Task capacity is the maximum number of tasks that a worker or listener can accept. When the number of accepted tasks reaches this maximum, the worker or listener cannot accept additional tasks until it completes one or more of them.

When the scheduler receives a task, it assigns the task to the worker or listener with the greatest worker or listener weight—unless the pending tasks assigned to that worker or listener exceed its task capacity. When the preferred worker or listener has too many tasks, the scheduler assigns the new inbound task to the worker or listener with the next greatest worker or listener weight.

Enabling a session as a queue member tacitly sets its worker or listener task capacity to 1. Programmers can tune task capacity based on two factors:

Multi-tasking program on multiprocessing hardware.

On a multiprocessing computer, a multi-threaded program that devotes n threads and n processors to inbound tasks has task capacity n.

Communication time lag.

In most distributed queue applications, the communication time is an insignificant fraction of the task turnaround time. That is, the time required to assign a task and signal its completion is very small compared to the time required to process the task itself. For example, when average task turnaround time is 2000 milliseconds, of which communication time contributes only 10 milliseconds to the total, then task capacity is the same as the number of processors or threads.

However, in some situations communication time can be significant—for example, when the queue members are distributed at distant sites connected by a WAN. When communication time is significant, the meaning of task capacity changes; instead of signifying the number of tasks that a listener can process concurrently, it signifies the number of tasks that can fill the listener's capacity despite the communication time lag. For example, when the average task turnaround time is 1500 milliseconds, of which the average task processing time contributes 1000 milliseconds to the total, then setting the task capacity to 3 minimizes the listener's idle time between tasks.

When tuning task capacity to compensate for communication time lag, balance is critical. Underloading a listener (by setting its tasks capacity too low) can cause the listener to remain idle while it waits for the schedule to assign its next task. Conversely, overloading a listener (by setting its task capacity too high) can cause some assigned tasks to wait, while other listeners that might have accepted those tasks remain idle.

Task Scheduling

In a further application of this invention, the broad concepts of distributed queuing can be applied to scheduling tasks for different task doing applications. In this application an application can be either a scheduler or a worker or both. Each worker is assigned a weight indicating its ability to do work, usually the number of tasks it can do simultaneously. Typically, workers assign their own weights.

One application/member of a group becomes the scheduler. Once this occurs, all other applications become designated workers only. The scheduler becomes both a worker and the scheduler.

When a task is received by the group (the scheduler) it assigns the task to the worker with the highest "weight" or ability to do tasks. The worker then calls back to the scheduler accepting the task and, upon completion, returns a call to the scheduler indicating this fact. In certain instances, the call back to the scheduler includes both an acceptance and a notification of task completion.

Two Appendices, A and B are attached. These appendices include detailed C coding information respectively for Certified messaging and for message queuing.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from its spirit or scope.

Appendix A: Certified Message Delivery (Programming Details for C Programmers)

As indicated previously, even though some communications are highly reliable, certain applications require even stronger assurances of delivery. Certified delivery features offers greater certainty of delivery even in situations where processes and their network connections are unstable.

This Appendix A provides programming details for C programmers wishing to implement Certified message Delivery. The Appendix provides, in Table A1, an overview listing of Certified's messaging Deliver Datatypes and Functions. Each Datatype or Function is then described in greater detail with Cross-references to related Datatypes or Functions.

Certified Message Delivery CAPI

The following table summarizes the datatypes and functions in the certified message delivery C API.

TABLE A1

Certified Message Delivery: Datatypes and Functions

| Item | Description |
| --- | --- |
| rvcm_Enable ( ) | Enable an existing session for delivery tracking. |
| rvcm_ListenSubject ( ) | Listen for broadcast messages, and request certified delivery whenever available. |
| rvcm_ListenInbox ( ) | Open a delivery-tracking inbox to listen for point-to-point messages, and request certified delivery whenever available. |
| rvcm_Callback | Function type of callback functions that receive and process inbound messages for delivery-tracking listeners. |
| rvcm_ListenId | Certified listening calls return identifiers of this type. |
| rvcm_seq | Certified messages bear sequence numbers of this type. |
| rvcm_close ( ) | Close a delivery-tracking endpoint; stop listening for messages on it. |
| rvcm_Send ( ) | Send a labeled message, and track delivery to cooperating listeners. |
| rvcm_SendWithReply ( ) | Send a labeled request message, and track delivery to cooperating listeners. |
| rvcm_AddListener ( ) | Pre-register an anticipated listener. |
| rvcm_RemoveListener( ) | Cancel certified delivery of a subject to a listening correspondent. |
| rvcm_DisallowListener( ) | Cancel certified delivery of all subjects to a listening correspondent, and deny subsequent registration requests. |
| rvcm_AllowListener( ) | Invite a receiver to reinstate certified delivery for its listeners. |
| rvcm_NoAutoConfirm( ) | Override automatic confirmation of delivery. |
| rvcm_confirm( ) | Confirm delivery of a certified message. |
| rvcm_ReviewLedger( ) | Summarize the delivery status of messages in the ledger, |
| rvcm_ReviewCallback | Function type of callback functions that process ledger information for rvcm_ReviewLedger( ). |
| rvcm_SyncLedgerFile( ) | Synchronize the ledger file. |
| rvcm_Error | Datatype. Enumerates error codes for the certified message delivery API. |
| rvcm_ErrorText( ) | Return a text string describing an error code. | rvcm_Enable( )
Function
Declaration

```
rvcm_Error rvcm_Enable (
    rv_Session      session,
    rv_Name         name,
    rv_Name         reserved,
    char*           ledgerFile,
    rv_Boolean      requireOldMsgs
)
```

Purpose

Enable an existing session for delivery tracking.

Remarks

All other rvcm functions require an enabled session as an argument. Programs must call rvcm_Enable ( ) before any other calls related to certified delivery.

A user can use an enabled session for both certified and non-certified communications. For example, an enabled session supports calls to rvcm_Send ( ) and rv_Send ( ).

Once a session is enabled for certified delivery, it remains enabled until terminated with rv_Term ( ). The user cannot subsequently change the certified delivery parameters of the session.

Name rvcm_Enable ( ) promotes its session argument to a delivery-tracking session.

If name is NULL, then rvcm_Enable ( ) generates a unique, non-reusable name for this session.

If name is non-NULL, then the session binds that name. A correspondent can persist beyond session termination only when it has both a reusable name and a file-based ledger.

Ledger File

Every delivery-tracking session stores the state of its certified communications in a ledger, which is stored in memory associated with the process.

If ledgerFile is NULL, then this session uses a only process-based ledger. When the session or process terminates, all information in the ledger is lost.

If ledgerFile specifies a valid file name, then this session uses that file for ledger storage. If the session or process terminates with incomplete certified communications, the ledger file records that state. When a new session binds the same reusable name, it reads the ledger file and continues certified communications from the state stored in the file.

Even though a session uses a ledger file, it may sometimes replicate parts of the ledger in process-based storage for efficiency; however, programmers cannot rely on this replication.

If the operating system supports raw storage devices (also called raw partitions), the user can specify such a device as the ledger file.

An optional prefix determines whether writing to the ledger file is a synchronous operation:

To specify synchronous writing (the default), either supply an ordinary file name, or prepend the string sync* to the file name; for example, "myLedger" (implicit) or "sync*/local/myLedger" (explicit). Each time a ledger item is written, the call does not return until the data is safely stored in the file system.

To specify asynchronous writing, prepend the string nosync* to the file name; for example, "nosync*/local/myLedger". The ledger file might not accurately reflect program state in cases of hardware or operating system kernel failure.

A program that uses an asynchronous ledger file can explicitly synchronize it by calling rvcm_SyncLedgerFile( ), described below.

Parameters

| Parameter | Description |
| --- | --- |
| session | Enable this session for certified delivery tracking. |
| name | Bind this reusable name to the session, so the session represents a persistent correspondent with this name.<br>If non-Null, the name must conform to the syntax rules for subject names. It cannot begin with reserved tokens. It cannot be a non-reusable name generated by another call to rvcm_Enable( ).<br>If this argument is NULL, then rvcm_Enable( ) generates a unique, non-reusable name for the duration of the session. |
| reserved | This parameter is reserved for future enhancement. The user must supply NULL for foilNard compatibility. |
| ledgerFile | If this argument is non-NULL, then this session uses a file-based ledger. The argument must represent a valid file name. Actual locations corresponding to relative file names conform to operating system conventions.<br>Prepending nosync* to the file name specifies asynchronous output to the file system. sync* or no prefix specifies synchronous output (flushed before each output call returns).<br>If this argument is NULL, then this session uses a process-based ledger. |
| requireOldMsgs | This parameter indicates whether a persistent correspondent requires delivery of messages sent to a previous session with the same name, for which delivery was not confirmed. Its value affects the behavior of other delivery-tracking senders.<br>If this parameter is RV_TRUE and name is non-NULL, then this session requires certified senders to retain unacknowledged messages sent to this persistent correspondent. When this session begins listening to the appropriate subjects, the senders can complete delivery. (It is an error to supply RV_TRUE when name is NULL.)<br>If this parameter is RV_FkLSr., then this session does not require certified senders to retain unacknowledged messages. Certified senders may delete those messages from their ledgers. |

Errors

| RVCM Error Code | Indicates |
| --- | --- |
| RVCM_OK | No error. The call completed successfully. |
| RVCM_ERR_INVALID_SESSION | The function received a session argument that is not a valid rv_session (for example, NULL, or a session that has already terminated). |
| RVCM_ERR_BAD_SESSION_NAME | The function received an ill-formed reusable name. |

-continued

| RVCM Error Code | Indicates |
| --- | --- |
| RVCM_ERR_NO_MEMORY | The function could not complete because the operating system denied its request to allocate storage. |
| RVCM_ERR_FILE_IO_ERROR | rvcm_Enable ( ) encountered an error while opening the ledger file. For example, an explicitly named directory does not exist. |
| RVCM_ERR_FILE_NO_PERMISSION | File privileges are insufficient for rvcm_Enable ( ) to open the ledger file. |
| RVCM_ERR_LEDGER_NAME_CONFLICT | rvcm_Enable ( ) received NULL as the name parameter, but a nOn-NULL value as the ledgerFile parameter. |
| RVCM_ERR_PARAMETER_CONFLICT | The function received conflicting values for parameters. rvcm_Enable ( ) received RV_FALSE as its requireOldMsgs parameter, and NULL as its name parameter. A non-reusable name implies a transient correspondent, which cannot have backlog messages. |
| RVCM_ERR_FILE_NOT_LEDGER_OWNER | The reusable name recorded in the file differs from the name of this session. rvcm_Enable ( ) stopped reading the file. |
| RVCM_ERR_CORRUPT_LEDGER_FILE | The ledger file is corrupt. rvcm_Enable ( ) could read only part of the ledger file into process-based memory. Some information may be lost. |
| RVCM_ERR_SESSION_ALREADY_ENABLED | rvcm_Enable ( ) received a session that is already enabled for delivery tracking. It is illegal co enable a session more than once. |

Coding Example

```
cm_err = rvcm_Enable(sess, "CM_EXAMPLE". NULL,
        "my_ledger_file", RV_TRUE);
if (cm_err != RVCM_OK)
    {
    fprintf(stderr, 'Can't enable CM session--%s\n',
        rvcm_ErrorText (sess, cm_err) );
    exit (-1);
    }
```
See Also
rvcm_SyncLedgerFile( ), below
rvcm_ListenSubject( )
Function
Declaration
rvcm_Error rvcm_ListenSubject (
    rv_Session       session,
    rvcm_LisCenId*  listenid,
    rv_Name        subject,
    rvcm_Callback   dataCallbackFn,
    rv_Opaque      closureArg )

Purpose

Begin listening for messages that match the subject, and request certified delivery whenever available. Whenever a message arrives, the callback function receives it.

Remarks

This function is parallel to rv_ListenSubject ( )—it creates an endpoint to receive messages with matching subjects. The endpoint receives both labeled messages and ordinary messages.

When a labeled message arrives from an unfamiliar delivery-tracking session, the receiving session requests certified delivery for the subject. If the sending session accepts the request, then the two sessions cooperate to certify delivery of subsequent messages with this subject.

Unlike ordinary listening endpoints, the user cannot maintain more than one delivery-tracking listening endpoint per subject. When one endpoint is already open, subsequent calls to rvcm_ListenSubject( ) with the same subject return an error. (This restriction applies to each delivery-tracking session; however, a program with several delivery-tracking sessions can open independent delivery-tracking listeners with identical subjects.)

Unlike rv_ListenSubject( ), the user cannot use rvcm_ListenSubject( ) to listen to wildcard subjects.

The software automatically confirms message delivery when the data callback function returns.

Parameters

| Parameter | Description |
| --- | --- |
| session | A delivery-tracking session. |
| listenId | When rvcm_ListenSubject( ) returns (without error), this location contains a handle denoting the new endpoint. To stop listening on the subject, pass this handle to rvcm_Close( ). |
| subject | Listen for messages with this subject name. Wildcard subjects are illegal. |
| dataCallbackFn | When a message arrives, pass it to this callback function. |
| closureArg | Pass this closure argument to the callback function. This argument must be a pointer, but it can point to any type of data. It contains any information needed by the callback function. This argument is treated as an opaque closure, forwarding it to the callback function without accessing its value. |

Errors

| RVCM_ERR Code | Indicates |
| --- | --- |
| RVCM_OK | No error. The call completed successfully. |
| RVCM_ERR_INVALID_SESSION | The function received a session argument that is not a valid rv_session (for example, NULL, or a session that has already terminated). |
| RVCM_ERR_BAD_ARG | The function received an illegal argument. rvcm_ListenSubject( ) received either a NULL callback function, or a NULL listenid pointer. |
| RVCM_ERR_NO_MEMORY | The function could not complete because the operating system denied its request to allocate storage. |
| RVCM_ERR_BAD_SUBJECT | rvcm_ListenSubject( ) received an ill-formed subject name. Either it is NULL, or contained too many total characters, too many characters in an element, too many elements, a wildcard character, or an illegal prefix. |
| RVCM_ERR_DUPLICATE_SUBJECT | rvcm_ListenSubject( ) Can maintain at most one open listening endpoint per subject (per session); it cannot open a second listening endpoint for this subject. |
| RVCM_ERR_SESSION_NOT_ENABLED | The function received a session that is not enabled for delivery tracking. |

Coding Example

```
cm_err = rvcm_ListenSubject(sess, &listenId, subject,
         CM_callback, myClosure);
   if (cm_err != RVCM_OK)
       fprintf(stderr, "error %s listening to \"%s\"\n",
           rvcm_ErrorText (sess, cm_err), subject);
See Also
rvcm_Callback;
rvcm_ListenId;
rvcm_ListenInbox( );
rvcm_Close( ), all described below
rvcm_ListenInbox( )
Function
rvcm_Error rvcm_ListenInbox (
    rv_Session      session,
    rvcm_ListenId*  listenid,
    rv_Name         inbox,
    rv_Size         inboxLimit,
    rvcm_Callback   dataCallbackFn,
    rv_Opaque       closureArg)
```

Purpose

Open an inbox and begin listening for point-to-point messages addressed to it. Request certified delivery whenever available. Whenever a message arrives, pass it to the callback function.

Remarks

This function is parallel to rv_ListenInbox ( )—it creates an inbox to receive point-to-point messages. The inbox receives both labeled messages and ordinary messages.

When a labeled message arrives from an unfamiliar delivery-tracking session, the receiving session requests certified delivery for the inbox name. If the sending session accepts the request, then the two sessions cooperate to certify delivery of subsequent messages to this inbox.

Certified delivery to an inbox is limited to the duration of the inbox. Once the users closes an inbox or terminates its session, the inbox and its name become obsolete; the user can never open another inbox with the same name. Since the system can never complete delivery of messages addressed to an obsolete inbox, it automatically deletes stored messages when it detects that an inbox has become obsolete.

The system automatically confirms message delivery when the data callback function returns.

Parameters

| Parameter | Description |
| --- | --- |
| session | A delivery-tracking session. |
| listenId | When rvcm_ListenInbox ( ) returns (without error), this location contains a handle denoting the new inbox. To stop listening, pass this handle to rvcm_Close ( ). |
| inbox | Location to store the generated name of the new inbox. The allocated space must be at least RV_t, mX_INBOX_NAME (currently 100 bytes). |
| inboxLimit | Number of bytes allocated to store the new inbox name. |
| dataCallbackFn | When a message arrives, pass it to this callback function. |
| closureArg | Pass this closure argument to the callback function. This argument must be a pointer, but it can point to any type of data. It contains any information needed by the callback function, the system treats this argument as an opaque closure, forwarding it to the callback function without accessing its value. |

Errors

| RVCM_ERR Code | Indicates |
| --- | --- |
| RVCM_OK | No error. The call completed successfully |
| RVCM_ERR_INVALID_SESSION | The function received a session argument that is not a valid rv_session (for example, NULL, or a session that has already terminated). |
| RVCM_ERR_BAD_ARG | The function received an illegal argument. rvcm_ListenInbox ( ) received either a NULL inbox name pointer, a NULL callback function, or a NULL listenid pointer. |
| RVCM_ERR_NO_MEMORY | The function could not complete because the operating system denied its request to allocate storage. |
| RVCM_ERR_SESSION_NOT_ENABLED | The function received a session that is not enabled for delivery tracking. |

Coding Example

```
char inboxName [RV_MAX_INBOX_NAME];
cm_err = rvcm_ListenInbox(sess, &listenId, inboxName,
            sizeof(inboxName), CM_callback, myClosure);
    if (cm_err != RVCM_OK)
        fprintf(stderr, "error %s listening to certified inbox.\n",
            rvcm_ErrorText(sess, cm_err));
```

See Also,
rvcm_Callback, below
rvcm_ListenId, below
rvcm_ListenSubject( ), above
rvcm_Close( ), below.
rvcm_Callback
Datatype
Declaration
void* rvcm_Callback (
    rv_Session      session,
    rv_Name         subject,
    rv_Name         replyName,
    rvmsg_Type      msgType,
    rvmsg_Size      msgSize,
    rvmsgData       msg,
    rvcm_Seq        sequenceNum,
    rv_Name         senderName,
    rv_Opaque       closureArg )

Purpose rvcm_Callback is the function type of data callback functions to delivery-tracking listeners. Applications define functions of this type to receive inbound messages and take appropriate actions.

Remarks

This function type is parallel to rv_Callback. Notice that its function signature includes two additional parameters, senderName and sequenceNum, to receive the tracking data that labels the inbound message. Application programs can use these arguments for testing and auditing.

The system automatically confirms message delivery when the data callback function returns.

The user can write several callback functions to process the various kinds of messages that the application expects to receive. The user can use the same callback function to process messages at several endpoints. Callback functions can take any action in processing a message, except for the following restrictions:

Callback functions must not attempt to modify the data (the values of the parameters msg, subject, reillyName and senderName) in any manner. The callback function receives data through pointers; the actual data resides in memory that does not belong to the application. The data pointers remain valid only until the callback function returns.

The data callback functions must return promptly.

Parameters

| Parameter | Description |
| --- | --- |
| session | This parameter receives the current session. |
| subject | This parameter receives the destination subject name of the inbound message. Do not modify this value. This pointer remains valid only until the callback function returns. |
| replyName | If the inbound message carries a name for replies, this parameter receives it. Otherwise NULL. Do not modify this value. This pointer remains valid only until the callback function returns. |
| msgType | This parameter receives the datatype of the message. |
| msgSize | This parameter receives the size (in bytes) of the message. |
| msg | This parameter receives a pointer to the message data. Do not modify this value. This pointer remains valid only until the callback function returns. |
| sequenceNum | If the message is certified, this parameter receives the sequence number that the sender assigned to the message. Otherwise, this parameter receives zero. |
| senderName | If the message is labeled, this parameter receives the name of the delivery-tracking session that sent the message. Otherwise, this parameter receives NULL. Do not modify this value. This pointer remains valid only until the callback function returns. |
| closureArg | This parameter receives a closure argument supplied by the application when it began listening. This argument is a pointer, but it can point to any type of data. It contains any information needed by the callback function, the system treats this argument as an opaque closure, forwarding it to the callback function without accessing its value. |

Coding Example

This example code illustrates a data callback function for receiving messages with certified delivery.

```
void
CM-callback (
        rv_Session session,
        rv_Name subject,
        rv_Name replyName,
        rvmsg_Type msgType,
        rvmsg_Size msgSize,
        rvmsg_Data msg,
        rvcm_Seq seqNumber,
        rv_Name sender,
        rv_Opaque myClosureArg )
{
    printf("Received: subject=%s, reply=%s. message=",
        subject, (replyName!=NULL ? replyName : "<none>"));
    rvmsg_PrintItem(session, msgType. msgSize, msg, NULL);
    printf("\n");
    printf(" sequence number=%ld. sender=%s\n",
        seqNumber, (sender!=NULL ? sender : "<none>"));
    fflush(stderr);
}
See Also
rvcm_ListenId; rvcm_Seq; and rvcm_Close( ), below.
rvcm_ListenId
Datatype
Declaration
typedef void* rvcm_ListenId;
```

Purpose

The rvcm_ListenSubject ( ) arid rvcm_ListenInbox ( ) functions return a handle of type rvcm_ListenId. To stop listening for the corresponding information, pass this handle to rvcm_Close ( ).

Remarks an rvcm_ListenId is not meaningful outside of the session in which it was created. Each rvcm_ListenId is a unique handle representing an association between a subject and a callback function. Use rvcm_ListenId only within the local program that receives it from one of the listening functions, and treat it as opaque.

rvcm_Seq

Datatype

Declaration typedef unsigned long rvcm_Seq;

Purpose

Sequence number of a labeled message.

Remarks

Sequence numbers are limited to 32 bits on all platforms (even platforms that support 64-bit integers).

```
                    rvcm_Close( )
                    Function
                    Declaration
                    rvcm_Error rvcm_Close (
                        rv_Session    session,
                        rvcm_ListenId listenid
```

Purpose

Close a delivery-tracking endpoint; stop listening for messages on it.

Remarks

This function is parallel to rv_Close ( ).

Cooperating senders receive a REGISTRATION. CLOSED advisory, indicating that the delivery tracking agreement is no longer in effect. Senders receive a DELIVERY. FAILED advisory for each undelivered message to the closed endpoint, and the system removes undelivered messages from the sender's ledger.

The system deletes the listener's ledger items corresponding to the closed subject.

When rvcm_Close ( ) closes an endpoint, it generates a HOST.LISTEN.STOP advisory message to inform other applications that this application has stopped listening to the subject.

It is important that a persistent listener close a delivery-tracking endpoint when it no longer requires certified delivery of the corresponding subject—and only then. Open endpoints cause certified senders to store messages in the ledger while awaiting delivery confirmation from the sender. From the sender's perspective, a persistent listener that exits without closing its listening endpoints appears the same as a listener that terminates abnormally; the sender continues to store messages awaiting the return of the Listener process. Once an endpoint is closed, senders do not store certified messages for that listener, and successive listener processes with the same correspondent name do not receive certified delivery of messages sent in the interim.

Coding Example

Close endpoints when the application is finished receiving data Closing endpoints lets TiB/Rendezvous software re-use the associated storage resources. After closing an endpoint, delete all references to it, to guard against closing it twice.

It is illegal to close the same endpoint more than once. On some platforms, the error RVCM_ERR_NONEXISTENT_ID results; on other platforms, the result can be a fatal error (because it references dynamically allocated memory that has been freed).

This code fragment illustrates the recommended idiom for closing endpoints:

```
            if (foo->listenId != NULL)
                (rvclm_Close(foo->listenId);
                foo->listenId = NULL; }
```

Parameters

| Parameter | Description |
|---|---|
| session | The delivery-tracking session that created the endpoint. |
| listenId | Close the endpoint that this handle denotes. |

Errors

| RVCM_ERR Code | Indicates |
| --- | --- |
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_BAD_ARG | The function received an illegal argument. rvcm_Close( ) received a NULL listenId pointer. |
| RVCM_ERR_NONEXISTENT_ID | rvcm_Close ( ) received a NULL listenId pointer either it is NULL, or it points to something other than an rvcm_ListenId, or it points to an endpoint that has already been closed. |
| RVCM_ERR_NO_MEMORY | The function could not complete because the operating system denied its request to allocate storage. |
| RVCM_ERR_SESSION_NOT_ENABLED | The function received a session that is not enabled for delivery tracking. |

See Also
rvcm_ListenId, above.
rvcm_Send( )
Function
Declaration
```
rvcm_Error rvcm_Send (
    rv_Session      session,
    rv_Name         subject,
    rvmsg_Type      msgType,
    rvmsg_Size      msgSize,
    rvmsg_Data      msg,
    unsigned long   timeLimit,
    rvcm_Seq*       sequenceNum )
```

Purpose

Send a labeled message, and track delivery to cooperating listeners.

Remarks

This function is parallel to rv_Send ( ). Notice that its signature includes two additional parameters, timeLimit and SequenceNum.

Use timeLimit to specify the duration of the message (in seconds). The system retains the message in its ledger until either it receives delivery confirmation from all cooperating listeners, or the timeLimit expires. If the time limit expires before delivery is complete, the system removes the message from the ledger, and generates a DELIVERY. FAILED advisory message listing the cooperating listeners that did not confirm delivery of the message.

We recommend a timeLimit value greater than 60 seconds, since the domain holds messages for 60 seconds.

rvcm_Send ( ) labels the message with the name of the delivery-tracking session and a sequence number. rvcm_Send ( ) passes the sequence number back to the caller in its sequenceNum parameter (the user can use this number for auditing).

Each sending session maintains a separate sequence for each subject it sends. As a result, receivers can uniquely identify each labeled message by the three data callback arguments subject, senderName and sequenceNum.

When msg has self-evident length, the user may supply zero for msgSize (the system computes the actual size automatically). Types with self-evident size are RVMSG_RVMSG, RVMSG_STRING (when the string is NULL-terminated) and RVMSG_ENCRYPTED. All other types require an explicit size argument in this call.

rvcm_Send( )

rvcm_Send ( ) copies its arguments. After rvcm_Send ( ) returns, the user may free or reuse the storage (for example, a message buffer).

Warning

It is illegal to send messages to wildcard subject names. Although rvcm_Send ( ) does not prevent the user from sending illegally to wildcard subjects, the results are unpredictable.

Parameters

| Parameter | Description |
| --- | --- |
| session | A delivery-tracking session. |
| subject | Send the message to this subject name or inbox. |
| msgType | Datatype of the message data. |
| msgSize | Length of the data (in bytes). |
| msg | Location of the data to send. |
| timeLimit | Retain the message in the ledger, and continue attempts at delivery either until completion of delivery or until this time limit (in seconds) expires.<br>Zero is a special value, indicating no time limit; the message remains in the ledger until delivery is complete to all certified listeners.<br>A non-zero value less than 60 seconds adds no advantage over ordinary reliable message delivery, since rvd retains and retransmits messages for 60 seconds. |
| sequenceNum | This location receives the sequence number of this message. |

Errors

| RVCM_ERR Code | Indicates |
| --- | --- |
| RVCM_OK | No error. The call completed successfully. |
| RVCM_ERR_INVALID_SESSION | The function received a session argument that is |

-continued

| RVCM_ERR Code | Indicates |
|---|---|
| RVCM_ERR_BAD_ARG | not a valid rv_Session (for example, NULL, or a session that has already terminated). The function received an illegal argument. rvcm_Send ( ) or rvcm_SendWithReply ( ) received either a NULL subject, or a NULL sequence number pointer |
| RVCM_ERR_NO_MEMORY | The function could not complete because the operating system denied its request to allocate storage. |
| RVCM_ERR_BAD_SUBJECT | rvcm_Send ( ) or rvcm_SendWithReply ( ) received an ill-formed subject name. Either it contained too many total characters, too many characters in an element, or too many elements. |
| RVCM_ERR_SESSION_NOT_ENABLED | The function received a session that is not enabled for delivery tracking. |

Coding Example

```
int time_limit = 600; /* 600sec = 10min */
cm_err = rvcm_Send(sess, subject, type, sizeof(msg), msg,
        time_limit, &seq_no);
if (cm_err == RVCM_OK)
    fprintf(stderr, "Sent sequence num %d\n".seq_no);
else
    fprintf(stderr, "Error while sending certified message: %s\n".
        rvcm_ErrorText (sess, cm_err) );
See Also
rvcm_Seq, above
rvcm_SendWithReply( ), below.
rvcm_SendWithReply( )
Function
Declaration
rvcm_Error rvcm_SendWithReply (
    rv_Session       session,
    rv_Name          subject,
    rv_Name          replyName,
    rvms g_Type      msgType,
    rvmsg_Size       msgSize,
    rvmsg_Data       msg,
    unsigned long timeLimit,
    rvcm_Seq*        sequenceNum
```

Purpose

Send a labeled request message, and track delivery to cooperating listeners. A request message includes a reply name as a return address for response messages.

Remarks

This function is parallel to rv_SendWithReply ( ). Notice that its signature includes two additional parameters, timeLimit and SequenceNum.

The reply name must be the subject name of an open listening endpoint (either broadcast or inbox). An application may receive zero, one or several responses to a request message. Before the user calls rvcm_SendWithReply ( ) the user must ensure that the appropriate application components are listening to the reply name.

rvcm_SendWithReply ( ) is a non-blocking function. It returns immediately, and the callback function receives any replies asynchronously. A reply is not guaranteed (for example, if the receiver does not send any reply).

Use timeLimit to specify the duration of the message, the system retains the message in its ledger until either it receives delivery confirmation from all cooperating listeners, or the timeLimit expires. If the time limit expires before delivery is complete, the system removes the message from the ledger, and generates a DELIVERY.FAILED advisory message listing the cooperating listeners that did not confirm delivery of the message.

A timeLimit value greater than 60 seconds is recommended, since the domain holds messages for 60 seconds.

rvcrn_Send WithReply( )

rvcm_SendWithReply( ) labels the message with the name of the delivery-tracking session and a sequence number. rvcm_SendWithReply( ) passes the sequence number back to the caller in its sequenceNum parameter (the user can use this number for auditing).

Each sending session maintains a separate sequence for each subject it sends. As a result, receivers can uniquely identify each labeled message by the three data callback arguments subject, senderName and sequenceNum.

When msg has self-evident length, the user may supply zero for msgSize (the system computes the actual size automatically). Types with self-evident size are RVMSG_RVMSG, RVMSG_STRING (when the string is NULL-terminated) and RVMSG_ENNCRYPTED. All other types require an explicit size argument in this call.

rvcm_SendWithReply( ) copies its arguments. After rvcm_SendWithReply( ) returns, the user may free or reuse the storage (for example, a message buffer).

Warning

It is illegal to send messages to wildcard subject names. Although the function rvcm_SendWithReply( ) does not prevent the user from sending illegally to wildcard subjects, the results are unpredictable.

Parameters

| Parameter | Description |
|---|---|
| Session | A delivery-tracking session. |
| Subject | Send the message to this subject name or inbox. |
| ReplyName | Subject name for replies to this request message (similar to a return address on a letter, and delivered to receiving applications in the replyName argument of the callback function). The reply name may be an inbox or subject name. Before calling rvcm_SendWithReply( ), ensure that a listening endpoint is already open for the reply name. |
| MsgType | Datatype of the message data. |
| MsgSize | Length of the data (in bytes). |
| Msg | Location of the data to send. |
| timeLimit | Retain the message in the ledger, and continue attempts at delivery either until completion of delivery or until this time limit (in seconds) expires. Zero is a special value, indicating no time limit; the message remains in the ledger until |

-continued

| Parameter | Description |
|---|---|
| | delivery is complete to all certified listeners. A non-zero value less than 60 seconds adds no advantage over ordinary reliable message delivery, since rvd retains and retransmits messages for 60 seconds. |
| sequenceNum | This location receives the sequence number of this message. |

Errors

| RVCM_ERR Code | Indicates |
|---|---|
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_BAD_ARG | The function received an illegal argument. rvcm_Send( ) or rvcm_SendWithReply( ) received either a NULL subject, or a NULL sequence number pointer. |
| RVCM_ERR_NO_MEMORY | The function could not complete because the operating system denied its request to allocate storage. |
| RVCM_ERR_BAD_SUBJECT | rvcm_Send( ) or rvcm_SendWithReply( ) received an ill-formed subject name. Either it contained too many total characters, too many characters in an element, or too many elements. |
| RVCM_ERR_SESSION_NOT_ENABLED | The function received a session that is not enabled for delivery tracking. |

Coding Example

```
cm_err = rvcm_SendWithReply(sess, subject, reply,
        type, sizeof(msg}, msg,
        600. &seq_no);
(cm_err == RVCM_OK)
        fprintf(stderr, "Sent sequence num %d\n", seq_no);
else
        fprintf(stderr, "Error while sending certified message: %s\n",
                rvcm_ErrorText (sess, cm_err) );
```
See Also
rvcm_Seq, page 203; and
rvcm_SendWithReply( ), above.
rvcm_Add Listener( )
Function
Declaration
rvcm_Error rvcm_AddListener (
     rv_Session    session,
     rv_Name       name,
     rv_Name       subject )

Purpose
Pre-register an anticipated listener.

Remarks
Some sending applications can anticipate requests for certified delivery—even before the listening applications begin running. In such situations, the sender can pre-register listeners, so the system begins storing outbound messages in the sender's ledger; when the listener requests certified delivery, it receives the backlogged messages.

If the correspondent with this name already receives certified delivery of this subject from this sender session, then rvcm_AddListener( ) has no effect.

If the correspondent with this name is disallowed, then rvcm_AddListener( ) returns an error. The usercan call rvcm_AllowListener( ) to supersede the effect of a prior call to rvcm_DisallowListener( ); then call rvcm_AddListener( ) again Parameters

| Parameter | Description |
|---|---|
| session | A delivery-tracking session. |
| subject | Anticipate a listener for this subject. |
| name | Anticipate a listener from a correspondent with this reusable name. | rvcm_AddListener( )

Errors

| RVCM_ERR Code | Indicates |
|---|---|
| RVCM_OK | No error. The call completed successfully. |
| RVCM_ERR_INVALID_SESSION | The function received a session argument that is not a valid rv_session (for example. NULL, or a session that has already terminated). |

-continued

| RVCM_ERR Code | Indicates |
| --- | --- |
| RVCM_ERR_BAD_SESSION_NAME | The function received an ill-formed reusable name. |
| RVMC_ERR_BAD_ARG | The function received an illegal argument. rvcm_AddListener( ) received a NULL listener name. |
| RVCM_ERR_SESSION_NOT_ENABLED | The function received a session that is not enabled for delivery tracking. |
| RVCM_ERR_BAD_SUBJECT | The function received an ill-formed subject name. Either it is NULL, or contained too many total characters, too many characters in an element, too many elements, or an illegal prefix. |
| RVCM_ERR_DISALLOWED_LISTENER | rvcm_AddListener( ) cannot add this listener because it is disallowed. First call rvcm_AllowListener( ). |

Coding Example

```
cm_err = rvcm_AddListener(sess, "LISTENER_17". subject);
if(cm_err != RVCM_OK)
    {
    fprintf(stderr, "Can't add CM listener:\n %s\n",
        rvcm_ErrorText(sess, cm_err));
    exit(-1);
    }
See Also
rvcm_RemoveListener( ), below.
rvcm_RemoveListener( )
Function
Declaration
rvcm_Error rvcm_RemoveListener (
    rv_Session     session,
    rv_Name        name, /* listening correspondent name */
    rv_Name        subject )
```

Purpose

Unregister a specific listener at a specific correspondent, and free associated storage in the sender's ledger.

Remarks

This function cancels certified delivery of the specific subject to the correspondent with this name. The listening correspondent may subsequently re-register for certified delivery of the subject. (In contrast, rvcm_DisallowListener( ) cancels certified delivery of all subjects to the correspondent and prohibits re-registration.)

Senders usually call this function when the ledger item for a listening correspondent has grown very large. Such growth indicates that the listener is not confirming delivery, and may have terminated. Removing the listener reduces the ledger size by deleting messages stored for the listener.

When a sending program calls this function, certified delivery software in the sender behaves as if the listener had closed the endpoint for the subject. The sending program deletes from its ledger all information about delivery of the subject to the correspondent with this name. The sending program receives a REGISTRATION. CLOSED advisory, to trigger any operations in the callback function for the advisory.

If the listening correspondent is available (running and reachable), it receives a REGISTRATION.NOT_CERTIFIED advisory, informing it that the sender no longer certifies delivery of the subject.

If the correspondent with this name does not receive certified delivery of the subject from this sender session, then rvcm_RemoveListener( ) returns RVCM_ERR_BAD_SUBJECT.

Parameters

| Parameter | Description |
| --- | --- |
| session | A delivery-tracking session. |
| subject | Cancel certified delivery of this subject. |
| name | Cancel certified delivery of the subject to the correspondent with this name. |

Errors

| RVCM_ERR Code | Indicates |
| --- | --- |
| RVCM_OK | No error. The call completed successfully. |
| RVCM_ERR_INVALID_SESSION | The function received a session argument that is not a valid rv_Session (for example, NULL Or a session that has already terminated). |
| RVCM_ERR_BAD_ARG | The function received an illegal argument. rvcm_RemoveListener( ) received a NULL listener name or NULL subject; or the sender does not |

-continued

| RVCM_ERR Code | Indicates |
| --- | --- |
|  | certify delivery of the subject to the listener. |
| RVCM_ERR_SESSION_NOT_ENABLED | The function received a session that is not enabled for delivery tracking. |
| RVCM_ERR_BAD_SUBJECT | The function received an ill-formed subject name. Either it is NULL, or contained too many total characters, too many characters in an element, too many elements, or an illegal prefix. rvcm_RemoveListener( ) received a subject containing wildcard characters; or the sender has not sent certified messages on this subject. |
| RVCM_ERR_DISALLOWED_LISTENER | rvcm_RemoveListener( ) cannot cancel certified delivery to this listener because the listener is disallowed. |

Coding Example

```
cm_err = rvcm_RemoveListener(sess, listener, subject);
if(cm_err != RVCM_OK)
    {
    fprintf(stderr, "Can't remove CM listener:\n %s\n",
            rvcm_ErrorText(sess, cm_err));
    exit(−1);
    }
```
See Also
rvcm_AddListener( ), above; and
rvcm_DisallowListener( ), below.
rvcm_DisallowListener( )
Function
Declaration
rvcm_Error rvcm_DisallowListener (
    rv_Session   session,
    rv_Name   name )

Purpose

Cancel certified delivery to all listeners at a specific correspondent. Deny subsequent certified delivery registration requests from those listeners.

Remarks

Disallowed listeners still receive subsequent messages from this sender, but delivery is not certified. That is:

The listener receives a REGISTRATION.NOT_CERTIFIED advisory, informing it that the sender has cancelled certified delivery of all subjects.

If the sender's ledger contains messages sent to the disallowed listener (for which this listener has not confirmed delivery), then the system removes those ledger items, and does not attempt to redeliver those messages.

The system presents subsequent messages (from the cancelling sender) to the listener with sequence number zero, to indicate that delivery is not certified.

Senders can promptly revoke the acceptance of certified delivery by calling rvcm_DisallowListener( ) within the callback function that processes the REGISTRATION.REQUEST advisory.

This function disallows a correspondent by name. If the correspondent terminates, and another process instance (with the same reusable name) takes its place, the new process is still disallowed by this sender.

To supersede the effect of rvcm_DisallowListener( ), call rvcm_AllowListener( ).

Parameters

| Parameter | Description |
| --- | --- |
| session | A delivery-tracking session |
| name | Cancel certified delivery to listeners at the session with this name. |

Errors

| RVCM_ERR Code | Indicates |
| --- | --- |
| RVCM_OK | No error. The call completed successfully. |
| RVCM_ERR_INVALID_SESSION | The function received a session argument that is not a valid rv_Session (for example, NULL< or a session that has already terminated). |
| RVCM_ERR_BAD_SESSION_NAME | The function received an ill-formed reusable name. |
| RVCM_ERR_BAD_ARG | The function received an illegal argument. |

-continued

| RVCM_ERR Code | Indicates |
|---|---|
| RVCM_ERR_SESSION_NOT_ENABLED | rvcm_DisallowListener( ) received a NULL listener name. The function received a session that is not enabled for delivery tracking. |

Coding Example

```
cm_err = rvcm_DisallowListener(sess, "LISTENER_17");
if(cm_err != RVCM_OK)
    {
    fprintf(stderr, "Can't disallow CM listener:\n %s\n",
        rvcm_ErrorText(sess, cm_err));
    exit(-1);
    }
rvcm_AllowListener( )
Function
Declaration
rvcm_Error rvcm_AllowListener (
    rv_Session   session,
    rv_Name      name )
```

Purpose

Invite the named receiver to reinstate certified delivery for its listeners, superseding the effect of any previous calls to rvcm_DisallowListener( ).

Remarks

Upon receiving the invitation to reinstate certified delivery, the system at the listening program automatically sends new registration requests. The sending program accepts these requests, restoring certified delivery.

Parameters

| Parameter | Description |
|---|---|
| session | A delivery-tracking session. |
| name | Accept requests for certified delivery to listeners at the session with this name. |

Errors

Coding Example

```
cm_err = rvcm_AllowListener(sess, "LISTENER_17");
if(cm_err != RVCM_OK)
    {
    fprintf(stderr, "Can't allow CM listener:ln %sin",
        rvcm_ErrorText(sess, cm_err));
    exit(-1);
    }
rvcm_NoAutoConfirm( )
Function
Declaration
rvcm_NoAutoConfirm(
    rv_Session       session,
    rvcm_ListenId    listenid);
```

Purpose

Override automatic confirmation of delivery for this listening endpoint.

Remarks

The default behavior of certified listeners is to automatically confirm message delivery upon return from the data callback function (see rvcm_Callback, above). This call selectively overrides this behavior for this specific listening endpoint. (This call does not affect other listening endpoints.)

By overriding automatic confirmation, the listener assumes responsibility for explicitly confirming each inbound certified message by calling rvcm_Confirm( ).

Consider overriding automatic confirmation when processing inbound messages involves asynchronous activity, such as computations in other threads, database queries, or additional network communications.

No method exists to restore the default behavior, reversing the effect of this function.

Parameters

| RVCM_ERR Code | Indicates |
|---|---|
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_BAD_SESSION_NAME | The function received an ill-formed reusable name. |
| RVCM_ERR_BAD_ARG | The function received an illegal argument. rvcm_AllowListener( ) received a NULL listener name. |
| RVCM_ERR_SESSION_NOT_ENABLED | The function received a session that is not enabled for delivery tracking. |

Parameter

| Parameter | Description |
|---|---|
| session | A delivery-tracking session. |
| listenId | Override automatic confirmation for inbound certified messages to this listening endpoint. |

Errors

| RVCM_ERR Code | Indicates |
|---|---|
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_NONEXISTENT_ID | rvcm_NoAutoConfirm( ) received an unusable listenId pointer-either NULL, or it points to something other than an rvcm_ListenId, or it has already been closed. |

See Also
rvcm_Callback above, and
rvcm_Confirm( ), below.
rvcm_Confirm( )
Function
Declaration
rvcm_Confirm( )
    rv_Session    session,
    rvcm_ListenId listenerId,
    rv_Name    senderName.
    rvcm_Seq    sequenceNumber)

Purpose
Confirm delivery of a certified message.

Remarks

Use this function only in programs that override automatic confirmation.

The triplet of subject name, sender and sequence number uniquely identifies each certified message. The subject name is already stored in the listening endpoint. The other two components—sender and sequence number—are explicit parameters of this function.

Parameters

| Parameter | Description |
|---|---|
| session | A delivery-tracking session. |
| listenId | Confirm delivery of a message by this listening endpoint. |
| senderName | Confirm delivery of a message from the sender with this correspondent name. |
| sequenceNumber | Confirm delivery of the message with this sequence number. |

Errors

| RVCM_ERR Code | Indicates |
|---|---|
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_BAD_ARG | The function received an illegal argument. rvcm_Confirm( ) received a sequence number argument that is out of range. |
| RVCM_ERR_ID_CONFIRM_CONFLICT | rvcm_Confirm( ) received a listenId that automatically confirms delivery. rvcm_Confirm( ) is only valid after overriding automatic confirmation with rvcm_NoAutoConfirm( ). |
| RVCM_ERR_NONEXISTENT_ID | rvcm_Confirm( ) received an unusable listenId pointer-either NULL, or it points to something other than an rvcm_ListenId, or it has already been closed. |
| RVCM_ERR_NONEXISTENT_PUBLISHER | rvcm_confirm( ) received a senderName argument that is not |

| RVCM_ERR Code | Indicates |
|---|---|
| | recognized as the name of a certified sender. |

See Also rvcm_Callback; and rvcm_NoAutoConfirm( ), above.
rvcm_ReviewLedger( )
Function
Declaration
rvcm_Error rvcm_ReviewLedger
    rv_Session    session,
    rv_Name    subject,
    rvcm_ReviewCallback    reviewCallbackFn
    rv_Opaque    closureArg );

Purpose

Summarize the delivery status of messages in the ledger,

Remarks

The callback function receives one message for each matching subject stored in the ledger. For example, when rvcm_ReviewLedger( ) receives FOO. * as its subject argument, it calls the callback function separately for these matching subjects—once for FOO.BAR, once for FOO.BAZ, and once for FOO.BOX.

However, if the callback function returns non-NULL, then rvcm_ReviewLedger( ) returns immediately.

If the ledger does not contain any matching items, rvcm_ReviewLedger( ) returns normally without calling the callback function.

For information about the content and format of the callback messages, see rvcm_ReviewCallback, below.

Parameters

| Parameter | Description |
|---|---|
| session | A delivery-tracking session. |
| subject | Review ledger items with this subject. If this subject contains wildcard characters ("*" or ">"), then review all items with matching subject names. The callback function receives a separate message for each matching subject in the ledger. |
| reviewCallbackFn | This function receives the review messages. |
| closureArg | Pass this closure argument to the callback function. This argument must be a pointer, but it can point to any type of data. It contains any information needed by the callback function, the system treats this argument as an opaque closure, forwarding it to the callback function without accessing its value. |

Errors

| RVCM_ERR Code | Indicates |
|---|---|
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_BAD_ARG | The function received an illegal argument. rvcm_ReviewLedger( ) received a NULL subject name or a NULL review callback function. |
| RVCM_ERR_NO_MEMORY | The function could not complete because the operating system denied its request to allocate storage. |
| RVCM_ERR_SESSION_NOT_ENABLED | The function received a session that is not enabled for delivery tracking. |

Coding Example

```
fprintf(stdout,"\nLedger review for subject "%s", %d:\n",
        subject, reviewMax);
/*** See rvcm_ReviewCallback example function, below. ***/
cm_err = rvcm_ReviewLedger (session, rv_Name)subject,
                    myReviewLedgerCallback,
                    (rv_Opaque)&reviewMax);
if ( cm_err != RVCM_OK)
    {
    fprintf(stderr, "Review ledger failed for "%s":\n\t%s\n",
        subject, rvcm_ErrorText(sess. cm_err));
    }
```

See Also rvcm_ReviewCallback, above.
rvcm_ReviewCallback
Datatype
Declaration
void* rvcm_ReviewCallback (
    rv_Session    session,
    rv_Name    subject,
    rvmsg_Msg    msg,
    rv_Opaque    closureArg )

Purpose rvcm_ReviewCallback is the function type of callback functions for reviewing the ledger. Applications define functions of this type to process the summary messages from rvcm_ReviewLedger( ).

Remarks rvcm_ReviewLedger( ) calls this callback once for each matching subject in the ledger.

To continue reviewing the ledger, return NULL from this callback function. To stop reviewing the ledger, return non-NULL from this callback function; rvcm_ReviewLedger( ) returns immediately.

Parameters

| Parameter | Description |
|---|---|
| session | This parameter receives the current session. |
| subject | This parameter receives the subject name that the message summarizes. |
| msg | This parameter receives a summary message describing the delivery status of messages in the ledger. The table below describes the fields of the summary message. |
| closureArg | This parameter receives a closure argument, which the application supplied when it called rvcm_ReviewLedger( ). This argument is a pointer, but it can point to any type of data. It contains any information needed by the callback function. The system treats this argument as an opaque closure, forwarding it to the callback function without accessing its value. |

Message Content

| Field Name | Description |
|---|---|
| subject | The subject that this message summarizes. This field has datatype RVMSG_STRING. |
| seqno_last_sent | The sequence number of the most recent message sent with this subject name. This field has datatype RVMSG_UTNT. |
| total_msgs | The total number of messages with this subject name. This field has datatype RVMSG_UINT. |
| total_size | The total storage (in bytes) occupied by all messages with this subject name. If the ledger contains ten messages with this subject name, then this field sums the storage space over all of them. This field has datatype RVMSG_UINT. |
| listener | Each summary message can contain one or more fields named listener. Each listener field contains a nested submessage with details about a single registered listener. This field has datatype RVMSG_RVMSG. |
| listener.name | Within each listener submessage, the name field contains the name of the delivery-tracking listener. This field has datatype RVMSG_STRING. |
| listener.last_confirmed | Within each listener submessage, the last_confirmed field contains the sequence number of the last message for which this listener confirmed delivery. This field has datatype RVMSG_UINT. |

Coding Example

```
/*** See rvcm_ReviewLedger( ) example call. above. ***/
void *
myReviewLedgerCallback(rv_Session sess,
        rv_Name subject,
        rvmsg_Msg msg,
        rv_Opaque arg)
{
int * count = (int*) arg;
/* Print the ledger item. */
printf("\nLedger item for '%s':\n", subject);
rvmsg_Print(sess, msg, NULL);
printf("\n");
if ( *count )
{
  (*count)--;
  if (( *count ) > 0);
  {
  /* When count reaches zero, stop. Return from
  rvcm_ReviewLedger( ) */
  return((void*)sess);
  }
}
return(NULL); /* Otherwise, continue to the next item. */
```

See Also
rvcm_ReviewCallback
rvcm_ReviewLedger( ), above.
rvcm_SyncLedgerFile( )
Function
Declaration
rvcm_Error rvcm_SyncLedgerFile (rv_Session session);

Purpose

Synchronize the ledger file to its storage medium,

Remarks

When this function returns, the session's current state is safely stored in the ledger file.

Delivery-tracking sessions that use synchronous ledger files need not call this function, since the current state is automatically written to the file system before returning.

Parameters

| Parameter | Description |
|---|---|
| session | Synchronize the ledger file associated with this delivery-tracking session. |

Errors

| RVCM Error Code | Indicates |
|---|---|
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_SESSION_NOT_ENABLED | The function received a session that is not enabled for delivery tracking. |
| RVCM_ERR_FILE_IO_ERROR | rvcm_SyncLedgerFile( ) encountered an |

-continued

| RVCM Error Code | Indicates |
|---|---|
| | error while writing the ledger file. |

See Also rvcm_Enable( ), above.

rvcm_Error

Datatype rvcm_Error iS art enumerated type for error codes. Table A2 lists the possible rvcm_Error values. The user can use the function rvcm_ErrorText( ) to convert rvcm_Error message codes to descriptive text. For more information, see rvcm_ErrorText( ) on page 244.

TABLE A2

Enumerated Values of rvcm_Error

| RVCM Error Code | Indicates |
|---|---|
| RVCM_OK | No error. The call completed successfully. |
| RVCM_ERR_INIT_FAILURE | rvcm_EnableQueue( ) could not initialize either the certified delivery or fault tolerance components upon which it depends. |
| RVCM_ERR_INVALID_SESSION | The function received a session argument that is not a valid rv_Session (for example, NULL, or a session that has already terminated). |
| RVCM_ERR_BAD_SESSION_NAME | The function received an ill-formed reusable name. rvcm_ListenSubject( ) received either a NULL callback function, or a NULL listenid pointer. rvcm_ListenInbox( ) received either a NULL inbox name pointer, a NULL callback function, or a NULL listenid pointer. rvcm_DisallowListener( ) received a NULL listener name. rvcm_AllowListener( ) received a NULL Listener name. rvcm_AdclListener( ) received a NULL listener name. rvcm_RemoveListener( ) received a NULL listener name or NULL subject; or the sender does not certify delivery of the subject to the listener. rvcm_Send( ) or rvcm_SendWithReply( ) received either a NULL subject, or a NULL sequence number pointer. rvcm_ReviewLedger( ) received a NULL subject name or a NULL review callback function. rvcm_Confirm( ) received a sequence number argument that is out of range. |
| RVCM_ERR_NO_MEMORY | The function could not complete because the operating system denied its request to allocate storage. |
| RVCM_ERR_BAD_SUBJECT | rvcm_Send( ). rvcm_SendWithReply( ) or rvcm_ListenSubject( ) received an ill-formed subject name. Either it is NULL, or contained too many total characters, too many characters in an element, too many elements, a wildcard character, or an illegal prefix. rvcm_RemoveListener( ) received a subject containing wildcard characters; or the sender has not sent certified messages on this subject. |
| RVCM_ERR_ID_CONFIRM_CONFLICT | rvcm_Confirm( ) received a listenid that automatically confirms delivery. rvcm_confirm( ) is only valid after overriding automatic confirmation with rvcm_NoAutoConfirm( ). |

TABLE A2-continued

Enumerated Values of rvcm_Error

| RVCM Error Code | Indicates |
| --- | --- |
| RVCM_ERR_NONEXISTENT_ID | rvcm_Close( ), rvcm_NoAutoConfirm ( ), or rvcm_Confirm( ) received an unusable listenid pointer--either NULL, or it points to something other than an rvcm_ListenId, or it has already been closed. |
| RVCM_ERR_DUPLICATE_SUBJECT | rvcm_ListenSubject( ) can open at most one listening endpoint per subject; it cannot open a second listening endpoint for this subject. |
| RVCM_ERR_NONEXISTENT_PUBLISHER | rvcm_Confirm( ) received a senderName argument that is not recognized as the name of a certified sender. |
| RVCM_ERR_DISALLOWED_LISTENER | rvcm_AddListener( ) cannot add this listener because it is disallowed. First call rvcm_AllowListener( ). rvcm_RemoveListener( ) cannot cancel certified delivery to this listener because the listener is disallowed. |
| RVCM_ERR_SESSION_ALREADY_ENABLED | rvcm_Enable( ) received a session that is already enabled for delivery tracking. It is illegal to enable a session more than once. |
| RVCM_ERR_SESSION_NOT_ENABLED | The function received a session that is not enabled for delivery tracking. |
| RVCM_ERR_LEDGER_NAME_CONFLICT | rvcm_Enable( ) received NULL as the name parameter, but a non-NULL value as the ledgerFile parameter. |
| RVCM_ERR_PARAMETER_CONFLICT | The function received conflicting values for parameters. rvcm_Enable( ) received RV_FALSE as its requireOldMsgs parameter, and NULL as its name Parameter. A non-reusable name implies a transient correspondent, which cannot have backlog messages. |
| RVCM_ERR_FILE_IO_ERROR | rvcm_Enable( ) encountered an error while opening the ledger file. For example, an explicitly named directory does not exist. rvcm_SyncLedgerFile( ) encountered an error while writing the ledger file. |
| RVCM_ERR_FILE_NO_PERMISSION | File access privileges are insufficient for rvcm_Enable ( ) to open the ledger file. |
| RVCM_ERR_FILE_NOT_LEDGER_OWNER | The reusable name recorded in the file differs from the name of this session. ryere_Enable ( ) stopped reading the file. |
| RVCM_ERR_CORRUPT_LEDGER_FILE | The ledger file is corrupt. rvcm_Enable( ) could read only part of the ledger file into process-based memory. Some information may be lost. |

See Also rvcm_ErrorText( ), below.

APPENDIX B: Distributed Queues (Programming Details for C Programmers)

This Appendix A provides programming details for C programmers wishing to implement Certified message Delivery. The Appendix provides, in Table A1, an overview listing of Certified's messaging Deliver Datatypes and Functions. Each Datatype or Function is then described in greater detail with Cross-references to related Datatypes or Functions.

As described above, Applications can use distributed queues for certified delivery to one of n listeners (queue member sessions). These distributed queue functions are typically used in combination with certified message delivery.

Distributed Queue CAPI

The following Table BA summarizes the datatypes and functions in the distributed queue C API.

TABLE B1

Distributed Queues: Dataty yes and Functions

| Item | Description | Page |
|---|---|---|
| rvcm_EnableQueue( ) | Enable a session as a distributed queue member | 248 |
| rvcm_rvcm_SetQueueAcceptTime( ) | Set the queue time limit for task acceptance. | 251 |
| rvcm_QueueAcceptTime( ) | Return the queue time limit for task acceptance. | 253 |
| rvcm_SetQueueCompleteTime( ) | Set the queue time limit for task completion. | 255 |
| rvcm_QueueCompleteTime( ) | Return the queue time limit for task completion. | 257 |
| rvcm_SetQueueListenerWeight( ) | Set the listener weight of a queue member. | 261 |
| rvcm_QueueListenerWeight( ) | Return the listener weight of a queue member. | 261 |
| rvcm_SetQueueListenerTasks( ) | Set the listener task capacity of a queue member. | 263 |
| rvcm_QueueListenerTasks( ) | Return the listener task capacity of a queue member. | 266 |
| rvcm_Error | Datatype Enumerates error codes for the certified message delivery API and distributed queue API. | 239 |
| rvcm_ErrorTest( ) | Return a text string describing an error code | 244 |

```
rvcm_EnableQueue( )
Function
Declaration
rvcm_Error rvcm_EnableQueue (
    rv_Session    session
    rv_Name       name,
    unsigned long schedulerWeight,
    unsigned long schedulerHeartbeat,
    unsigned long schedulerActivation );
```

Purpose

Enable a session for certified message delivery as part of distributed queue for one-of-n certified delivery.

Remarks

Each member of a distributed queue listens for the same subjects—yet even when n members listen, for each inbound message (or task), exactly one member processes the message.

Programs must call rvcm_EnableQueue( ) before any other calls related to distributed queues or certified listening.

Once a session becomes a queue member, it cannot resign membership except with rv_Term( ).

Queue Member Roles

Each distributed queue member session has two distinct roles—as a listener, and as a potential scheduler.

In the listener role, queue member sessions support a limited subset of certified delivery calls: rvcm_ListenSubject( ), rvcm_NoAutoConfirm( ) and rvcm_Confirm( ). Queue member sessions do not support any other certified delivery calls (in particular, calls associated with sending certified messages). However, they do support all standard system calls (for example, rv_Send( )).

System fault tolerance software maintains exactly one active scheduler in each queue: if the scheduler process terminates, another member assumes the role of scheduler. The queue member session in the scheduler role assigns inbound tasks to listeners in the queue. (A scheduler can assign tasks to its own listener component, but only does so when all other listeners are busy.)

Parameters

| Parameter | Description |
|---|---|
| session | The call enables this session. Before this call, the session must not yet be enabled for delivery tracking. |
| name | The session becomes part of the distributed queue with this reusable name. |
| schedulerWeight | Weight represents the ability of this session to fulfill the role of scheduler, relative to other members of the same queue. The queue members use relative scheduler weight values to elect one member as the scheduler; members with higher scheduler weight take precedence. Acceptable values range from 1 to 65535 (even though the parameter is declared as an unsigned long). |
| schedulerHeartbeat | The scheduler session sends heartbeat messages at this interval (in milliseconds). All sessions in the queue must specify the same value for this parameter. Acceptable values are the unsigned 32-bit integers (except zero). |
| schedulerActivation | When the heartbeat signal from the scheduler has been silent for this interval (in milliseconds), the queue member with the greatest scheduler weight takes its place as the new scheduler. All sessions in the queue must specify the same value for this parameter. Acceptable values are unsigned 32-bit integers (except zero). |

Errors

| RVCM_ERR Code | Indicates |
|---|---|
| RVCM_OK | No error. The call completed successfully. |
| RVCM_ERR_INVALID_SESSION | The function received a session argument that is not a valid rv_session (for example, NULL, or a session that has already terminated). |

| RVCM_ERR Code | Indicates |
|---|---|
| RVCM_ERR_SESSION_ALREADY_ENABLED | rvcm_Enable() received a session that is already enabled for delivery tracking. It is illegal to enable a session more than once. |
| RVCM_ERR_NO_MEMORY | The function could not complete because the operating system denied its request to allocate storage. |
| RVCM_ERR_INIT_FAILURE | rvcm_EnableQueue() could not initialize either the certified delivery or fault tolerance components upon which it depends. |

See Also rvcm_Enable( ), Appendix A
rvcm_ListenSubject( ), Appendix A
*******
rvcm_SetQueueAcceptTime( )
Function
Declaration
define DEFAULT_ACCEPT_TIME (0)
rvcm_Error rvcm_SetQueueAccepCTime (
    rv_Session   session,
    unsigned long acceptTime );

Purpose

Change the accept time parameter of a queue member session.

Remarks

When this session, acting as the scheduler, assigns a task to a listener (another queue member session), it sets a timer with this length (in milliseconds). If the timer elapses before the scheduler receives acceptance from the listener, the scheduler reassigns the task to another listener.

Zero is a special value, which specifies no limit on the acceptance time—that is, the scheduler does not set a timer, and does not reassign tasks.

Enabling a session as a queue member tacitly sets its accept time parameter to D<small>EFAULT_ACCEPT_TIME</small> (zero).

Parameters

| Parameter | Description |
|---|---|
| session | A session in a distributed queue. |
| acceptTime | This value (in milliseconds) becomes the new time limit for acceptance of tasks. It must be less than the complete time parameter (unless the complete time is zero). |

Errors

| RVCM_ERR Code | Indicates |
|---|---|
| RVCM_OK | No error. The call completed successfully. |
| RVCM_ERR_INVALID_SESSION | The function received a session argument that is not a valid rv_session (for example, NULL, or a session that has already terminated). |
| RVCM_ERR_BAD_ARG | The function received an illegal argument. |
| RVCM_ERR_SESSION_NOT_ENABLED | The function received a session that is not enabled for delivery tracking. |

See Also vcm_QueueAcceptTime( ), below
rvcm_QueueAcceptTime( )
Function
Declaration
define DEFAULT_ACCEPT_TIME (0)
rvcm_Error rvcm_QueueAcceptTime (
    rv_Session    session,
    unsigned long*   acceptTime );

Purpose

Extract the accept time parameter of a queue member session.

Remarks

When this session, acting as the scheduler, assigns a task to a listener (another queue member session), it sets a timer for the accept time (in milliseconds). If the timer elapses before the scheduler receives acceptance from the listener, the scheduler reassigns the task to another listener.

Zero is a special value, which specifies no limit on the acceptance time (the scheduler does not set a timer).

Enabling a session as a queue member tacitly sets its accept time parameter to DEFAULT_ACCEPT_TIME (zero).

Parameters

| Parameter | Description |
|---|---|
| session | A session in a distributed queue. |
| acceptTime | This location receives the stored time limit (in milliseconds) for acceptance of tasks. |

Errors

| RVCM_ERR Code | Indicates |
|---|---|
| RVCM_OK | No error. The call completed successfully. | rvcm_Qz, QuoueAcceptTime( )

| RVCM_ERR Code | Indicates |
|---|---|
| RVCM_ERR_INVALID_SESSION | The function received a session argument that is not a valid rv_session (for example, NULL, or a session that has already terminated). |
| RVCM_ERR_BAD_ARG | The function received an illegal argument. |
| RVCM_ERR_SESSION_NOT_ENABLED | The function received a session that is not enabled for delivery tracking. |

See Also rvcm_SetQueueAccepcTime( ), above
rvcm_SetQueueCompleteTime( )
Function
Declaration
define DEFAULT_COMPLETE_TIME (0)
rvcm_Error rvcm_SetQueueCompleteTime (
    rv_Session    session,
    unsigned long completeTime );

Purpose

Change the complete time parameter of a queue member session.

Remarks

When this session, acting as the scheduler, assigns a task to a listener (another queue member session), it sets a timer with this length (in milliseconds). If the timer elapses before the scheduler receives a completion message from the listener, the scheduler reassigns the task to another listener.

Zero is a special value, which specifies no limit on the completion time (the scheduler does not set a timer).

Enabling a session as a queue member tacitly sets its complete time parameter to DEFAULT_COMPLETE_TIME (zero).

Parameters

| Parameter | Description |
|---|---|
| session | A session in a distributed queue. |
| completeTime | This value (in milliseconds) becomes the new time limit for completion of tasks. It must be greater than the accept time parameter (unless the complete time is zero). |

Errors

| RVCM_ERR Code | Indicates |
|---|---|
| RVCM_OK | No error. The call completed successfully. |
| RVCM_ERR_INVALID_SESSION | The function received a session argument that is not a valid rv_session (for example, NULL, or a session that has already terminated). |
| RVCM_ERR_BAD_ARG | The function received an illegal argument. |
| RVCM_ERR_SESSION_NOT_ENABLED | The function received a session that is not enabled for delivery tracking. |

See Also rvcm_QueueCompleteTime( ), below
rvcm_QueueCompleteTime( )
Function
Declaration
define DEFAULT_COMPLETE_TIME (0)
rvcm_Error rvcm_QueueCompleteTime (
    rv_Session     session,
    unsigned long* completeTime );

Purpose

Extract the complete time parameter of a queue member session.

Remarks

When this session, acting as the scheduler, assigns a task to a listener (another queue member session), it sets a timer for the complete time (in milliseconds). If the timer elapses before the scheduler receives a completion message from the listener, the scheduler reassigns the task to another listener.

Zero is a special value, which specifies no limit on the completion time (the scheduler does not set a timer).

Enabling a session as a queue member tacitly sets its complete time parameter to DEFAULT_COMPLETE_TIME (zero).

Parameters

| Parameter | Description |
|---|---|
| session | A session in a distributed queue. |
| completeTime | This location receives the stored time limit (in milliseconds) for completion of tasks. |

Errors

| RVCM_ERR Code | Indicates |
|---|---|
| RVCM_0K | No error. The call completed successfully. |
| RVCM_ERR_INVALID_SESSION | The function received a session argument that is not a valid rv_session (for example, NULL, or a session that has already terminated). |

-continued

| RVCM_ERR Code | Indicates |
| --- | --- |
| RVCM_ERR_BAD_ABG | The function received an illegal argument. |
| RVCM_ERR_SESSION_NOT_ENABLED | The function received a session that is not enabled for delivery tracking. |

See Also rvcm_SetQueueCompleteTime ( ), below
rvcm_Error rvcm_QueueCompleteTime ( )
Function
Declaration
define DEFAULT_COMPLETE_TIME (0)
rvcm_Error rvcm_QueueCompleteTime (
    rv_Session    session,
    unsigned long*    completeTime );

Purpose

Extract the complete time parameter of a queue member session.

Remarks

When this session, acting as the scheduler, assigns a task to a listener (another queue member session), it sets a timer for the complete time (in milliseconds). If the timer elapses before the scheduler receives a completion message from the listener, the scheduler reassigns the task to another listener.

Zero is a special value, which specifies no limit on the completion time (the scheduler does not set a timer).

Enabling a session as a queue member tacitly sets its complete time parameter to DEFAULT_COMPLETE_TIME (zero).

Parameters

| Parameter | Description |
| --- | --- |
| session | A session in a distributed queue. |
| completeTime | This location receives the stored time limit (in milliseconds) for completion tasks. |

Errors

| RVCM_ERR Code | Indicates |
| --- | --- |
| RVCM-ERR-INVALID-SESSION | The function received a session argument that is not a valid rv_Session (for example, NULL, or a session that has already terminated). |
| RVCM-ERR-BAD-ARG | The function received an illegal argument. |
| RVCM_ERR_SESSION_NOT_ENABLED | The function received a session that is not enabled for delivery tracking. |
| RVCM_OK | No error. The call completed successfully. |

See Also rvcm_SetQueueCompeteTime ( ), above.
rvcm_SetQueueListenerWeight( )
Function
Declaration
define DEFAULT_LISTENER_WEIGHT (1)
rvcm_Error rvcm_SetQueueListenerWeight (
    rv_Session    session,
    unsigned long listenerWeight );

Purpose

Change the listener weight parameter of a queue member session.

Remarks

When the scheduler receives a task, it assigns the task to the available listener with the greatest listener weight.

A listener is considered available unless either of these conditions are true:

The pending tasks assigned to the listener exceed its task capacity.

The listener session is the scheduler. (The scheduler assigns tasks to its own listener only when no other listeners are available.)

Enabling a session as a queue member tacitly sets its listener weight parameter to DEFAULT_LISTENER_WEIGHT (1).

Parameters

| Parameter | Description |
| --- | --- |
| session | A session in a distributed queue. |
| listenerWeight | This value becomes the new listener weight of the session. |

Errors

| RVCM_ERR Code | Indicates |
| --- | --- |
| RVCM_OK | No error. The call completed successfully. |
| RVCM_ERR_INVALID_SESSION | The function received a session argument that is not a valid rv_Session (for example, NULL, or a session that has already terminated). |
| RVCM_ERR_BAD_ARG | The function received an illegal argument. |
| RVCM_ERR_SESSION_NOT_ENABLED | The function received a session that is not enabled for delivery tracking. |

See Also rvcm_QueueListenerWeight ( ), below.
rvcm_QueueListenerWeight( )
Function
Declaration
define DEFAULT_LISTENER_WEIGHT (1)
rvcm_Error rvcm_QueueListenerWeight (
    rv_Session    session,
    unsigned long*    listenerWeight );

Purpose

Extract the listener weight parameter of a queue member session.

Remarks

When the scheduler receives a task, it assigns the task to the available listener with the greatest listener weight.

A listener is considered available unless either of these conditions are true:

The pending tasks assigned to the listener exceed its task capacity.

The listener session is the scheduler. (The scheduler assigns tasks to its own listener only when no other listeners are available.)

Enabling a session as a queue member tacitly sets its listener weight parameter to DEFAULT_LISTENER_WEIGHT (1).

Parameters

| Parameter | Description |
| --- | --- |
| session | A session in a distributed queue. |
| listenerWeight | This location receives the current listener weight of the session. |

Errors

| RVCM_ERR Code | Indicates |
| --- | --- |
| RVCM_OK | No error. The call completed successfully. |
| RVCM_ERR_INVALID_SESSION | The function received a session argument that is not a valid rv_Session) for example, NULL, or a session that has already terminated). |
| RVCM_ERR_BAD_ARG | The function received an illegal argument. |
| RVCM_ERR_SESSION_NOT_ENABLED | The function received a session that is not enabled for delivery tracking. |

See Also rvcm_SetQueueListenerWeight ( ), above.
rvcm_SetQueueListenerTasks( )
Function
Declaration
define DEFAULT_LISTENER_TASKS (1)
rvcm_Error rvcm_SetQueueListenerTasks (
    rv_Session               session,
    unsigned long     listenerTasks );

Purpose

Change the listener tasks parameter of a queue member session.

Remarks

Task capacity is the maximum number of tasks that a listener can accept. When the number of accepted tasks reaches this maximum, the listener cannot accept additional tasks until it completes one or more of them.

When the scheduler receives a task it assigns the task to the listener (a queue member) with the greatest listener weight—unless the pending tasks assigned to that listener exceed its task capacity. When the preferred listener has too many tasks, the scheduler assigns the new inbound task to the listener with the next greatest listener weight.

Enabling a session as a queue member tacitly sets its listener tasks parameter to DEFAULT_LISTENER_TASKS (1).

Programmers can tune task capacity based on two factors:

Multi-tasking program on multiprocessing hardware.

On a multiprocessing computer, a multi-threaded program that devotes n threads and n processors to inbound tasks has task capacity n.

Communication time lag.

In most distributed queue applications, the communication time is an insignificant fraction of the task turnaround time. That is, the time required to assign a task and signal its completion is very small compared to the time required to process the task itself. For example, when average task turnaround time is 2000 milliseconds, of which communication time contributes only 10 milliseconds to the total, then task capacity is the same as the number of processors or threads.

However, in some situations communication time can be significant—for example, when the queue members are distributed at distant sites connected by a Wide Area Network (WARN). When communication time is significant, the meaning of task capacity changes; instead of signifying the number of tasks that a listener can process concurrently, it signifies the number of tasks that can fill the listener's capacity despite the communication time lag. For example, when the average task turnaround time is 1500 milliseconds, of which the average task processing time contributes 1000 milliseconds to the total, then setting the task capacity to 3 minimizes the listener's idle time between tasks.

When tuning task capacity to compensate for communication time lag, balance is critical. Underloading a listener (by setting its tasks capacity too low) can cause the listener to remain idle while it waits for the schedule to assign its next task. Conversely, overloading a listener (by setting its task capacity too high) can cause some assigned tasks to wait, while other listeners that might have accepted those tasks remain idle.

Parameters

| Parameter | Description |
| --- | --- |
| session | A session in a distributed queue. |
| listenerTasks | This value becomes the new listener task capacity of the session. The value must be 1 or greater. |

Errors

| RVCM_ERR Code | Indicates |
| --- | --- |
| RVCM_OK | No error. The call completed successfully. |
| RVCM_ERR_INVALID_SESSION | The function received a session argument that is not a valid rv_Session (for example, NULL, or |

-continued

| RVCM_ERR Code | Indicates |
|---|---|
| | a session that has already terminated). |
| RVCM_ERR_BAD_ARG | The function received an illegal argument. |
| RVCM_ERR_SESSION_NOT_ENABLED | The function received a session that is not enabled for delivery tracking. |

See Also

```
rvcm_QueueListenerTasks ( ), below.
rvcm_QueueListenerTasks( )
Function
Declaration
define DEFAULT_LISTENER_WEIGHT (1)
rvcm_Error rvcm_QueueListenerTasks (
     rv_Session      session,
     unsigned long*  listenerTasks );
```

Purpose

Extract the listener tasks parameter of a queue member session.

Remarks

Task capacity is the maximum number of tasks that a listener can accept. When the number of accepted tasks reaches this maximum, the listener cannot accept additional tasks until it completes one or more of them.

When the scheduler receives a task, it assigns the task to the listener (a queue member) with the greatest listener weight—unless the pending tasks assigned to that listener exceed its task capacity. When the preferred listener has too many tasks, the scheduler assigns the new inbound task to the listener with the next greatest listener weight.

Enabling a session as a queue member tacitly sets its listener tasks parameter to DEFAULT_LISTENER_TASKS (1).

Parameters

| Parameter | Description |
|---|---|
| session | A session in a distributed queue. |
| listenerTasks | This location receives the current listener task capacity of the session. |

Errors

| RVCM_ERR Code | Indicates |
|---|---|
| RVCM_OK | No error. The call completed successfully. |
| RVCM_ERR_INVALID_SESSION | The function received a session argument that is not a valid rv_session (for example, NULL, or a session that has already terminated). |
| RVCM_ERR_BAD_ARG | The function received an illegal argument. |

-continued

| RVCM_ERR Code | Indicates |
|---|---|
| RVCM_ERR_SESSION_NOT_ENABLED | The function received a session that is not enabled for delivery tracking. |

See Also rvcm_SetQueueListenerTasks( ), above.

What is claimed is:

1. In a computer-based publish/subscribe system, a method for communicating a target message from a publisher application to a receiving member of a distributed queue of subscriber applications, wherein the distributed queue of subscriber applications comprises a plurality of members, the method comprising:

an initiating member of the distributed queue of subscriber applications subscribing to receive messages pertinent to a subject, wherein the target message is pertinent to the subject;

a detecting member of the distributed queue of subscriber applications detecting the target message, wherein the target message was sent from the publisher application;

the receiving member of the distributed queue of subscriber applications receiving the target message; and a scheduling member of the distributed queue of subscriber applications communicating heartbeat messages to the plurality of members of the distributed queue of subscriber applications, the heartbeat messages indicating that the scheduling member is capable of performing tasks associated with the scheduling member.

2. The method of claim 1, wherein the initiating member, the detecting member, and the receiving member are all the same member of the distributed queue of subscriber applications.

3. The method of claim 1, wherein the target message is received by no more than one member of the distributed queue of subscriber applications.

4. The method of claim 1, wherein the receiving member of the distributed queue of subscriber applications comprises the member of the distributed queue of subscriber applications determined to be the member most capable of processing the target message.

5. The method of claim 4, wherein the member of the distributed queue of subscriber applications determined to be the member most capable of processing the target message is determined by the scheduling member of the distributed queue of subscriber applications, wherein the scheduling member routes the target message to the receiving member of the distributed queue of subscriber applications, and wherein the scheduling member receives message processing capability information from the plurality of members of the distributed queue of subscriber applications.

6. The method of claim 5, wherein the scheduling member of the distributed queue of subscriber applications comprises the member of the distributed queue of subscriber applications determined to be the member most capable of performing tasks associated with the scheduling member.

7. The method of claim 5, wherein, upon the scheduling member ceasing to communicate heartbeat messages to the plurality of members of the distributed queue of subscriber applications, a new scheduling member is selected, the new scheduling member comprising the member of the distributed queue of subscriber applications determined to be the member most capable of performing tasks associated with the scheduling member.

8. The method of claim 1, further comprising:
- a registering member of the distributed queue of subscriber applications registering with the publisher application for certified delivery of messages pertinent to the subject;
- an accepting member of the distributed queue of subscriber applications receiving an acceptance of registration for certified delivery from the publisher application; and
- after the target message is received, an acknowledging member of the distributed queue of subscriber applications acknowledging receipt of the target message to the publisher application.

9. The method of claim 8, wherein the initiating member, the registering member, the accepting member, the detecting member, the receiving member, and the acknowledging member are all the same member of the distributed queue of subscriber applications.

10. A distributed queue of subscriber applications for receiving a target message from a publisher application in a computer-based publish/subscribe system, the distributed queue of subscriber applications comprising a plurality of members, the plurality of members comprising:
- an initiating member, wherein the initiating member subscribes to receive messages pertinent to a subject, wherein the target message is pertinent to the subject;
- a detecting member, wherein the detecting member detects the target message, and wherein the target message was sent from the publisher application;
- a receiving member, wherein the receiving member receives the target message; and
- a scheduling member, wherein the scheduling member communicates heartbeat messages to the plurality of members of the distributed queue of subscriber applications, the heartbeat messages indicating that the scheduling member is capable of performing tasks associated with the scheduling member.

11. The distributed queue of subscriber applications of claim 10, wherein the initiating member, the detecting member, and the receiving member are all the same member.

12. The distributed queue of subscriber applications of claim 10, wherein the target message is received by no more than one member.

13. The distributed queue of subscriber applications of claim 10, wherein the receiving member comprises the member determined to be the member most capable of processing the target message.

14. The distributed queue of subscriber applications of claim 13, wherein the member determined to be the member most capable of processing the target message is determined by the scheduling member, wherein the scheduling member routes the target message to the receiving member, and wherein the scheduling member receives message processing capability information from the plurality of members.

15. The distributed queue of subscriber applications of claim 14, wherein the scheduling member comprises the member determined to be the member most capable of performing tasks associated with the scheduling member.

16. The distributed queue of subscriber applications of claim 14, wherein, upon the scheduling member ceasing to communicate heartbeat messages to the plurality of members, a new scheduling member is selected, the new scheduling member comprising the member determined to be the member most capable of performing tasks associated with the scheduling member.

17. The distributed queue of subscriber applications of claim 10, further comprising:
- a registering member, wherein the registering member registers with the publisher application for certified delivery of messages pertinent to the subject;
- an accepting member, wherein the accepting member receives an acceptance of registration for certified delivery from the publisher application; and
- an acknowledging member, wherein the acknowledging member acknowledges receipt of the target message to the publisher application after the target message is received.

18. The distributed queue of subscriber applications of claim 17, wherein the initiating member, the registering member, the accepting member, the detecting member, the receiving member, and the acknowledging member are all the same member of the distributed queue of subscriber applications.

* * * * *